United States Patent
Tomoda (10) Patent No.: US 11,859,078 B2
(45) Date of Patent: Jan. 2, 2024

(54) TREATMENT AGENT FOR CORE WIRES FOR TRANSMISSION BELTS, AND CORE WIRE AND METHOD FOR PRODUCING SAME

(71) Applicant: Mitsuboshi Belting Ltd., Kobe (JP)

(72) Inventor: Takuya Tomoda, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 315 days.

(21) Appl. No.: 17/440,271

(22) PCT Filed: Mar. 6, 2020

(86) PCT No.: PCT/JP2020/009638
§ 371 (c)(1),
(2) Date: Sep. 17, 2021

(87) PCT Pub. No.: WO2020/189332
PCT Pub. Date: Sep. 24, 2020

(65) Prior Publication Data
US 2022/0153986 A1    May 19, 2022

(30) Foreign Application Priority Data

Mar. 19, 2019  (JP) .................................. 2019-051513
Feb. 28, 2020  (JP) .................................. 2020-033980

(51) Int. Cl.
*C08L 63/00* (2006.01)
*C08L 9/08* (2006.01)
(Continued)

(52) U.S. Cl.
CPC .................. *C08L 63/00* (2013.01); *C08L 9/08* (2013.01); *C08L 75/04* (2013.01); *D06M 15/513* (2013.01);
(Continued)

(58) Field of Classification Search
CPC ..... F16G 5/06; F16G 1/12; F16G 1/10; F16G 5/10; F16G 5/08; F16G 1/16; F16G 5/14;
(Continued)

(56) References Cited

U.S. PATENT DOCUMENTS 3,855,870 A * 12/1974 Schnackenberg ......... F16G 1/10
474/263
5,116,286 A * 5/1992 Kinoshita ................. F16G 5/06
474/263
(Continued)

FOREIGN PATENT DOCUMENTS

CN       104761781 A    7/2015
CN       108350644 A    7/2018
(Continued)

OTHER PUBLICATIONS

Nov. 11, 2022—(EP) Extended Search Report—App 20774293.3.
(Continued)

*Primary Examiner* — Henry Y Liu
(74) *Attorney, Agent, or Firm* — Banner & Witcoff, Ltd.

(57) ABSTRACT

An aqueous treatment agent for preparing a cord by treating an untreated yarn for a power transmission belt includes at least a first aqueous treatment agent. The first aqueous treatment agent contains an epoxy resin (A), a polycarbonate polyol (B), and a blocked polyisocyanate (C). The epoxy resin (A) may contain a bisphenol type epoxy resin (A1). The polycarbonate polyol (B) may contain a polycarbonate diol (B1). The blocked polyisocyanate (C) may contain at least one blocked polyisocyanate selected from the group consisting of an aliphatic polyisocyanate or derivatives thereof and an aromatic polyisocyanate and having a dissociation temperature of 120° C. to 180° C.

16 Claims, 2 Drawing Sheets

(51) Int. Cl.
  *C08L 75/04* (2006.01)
  *D06M 15/513* (2006.01)
  *D06M 15/55* (2006.01)
  *D06M 15/564* (2006.01)
  *F16G 1/10* (2006.01)
  *F16G 5/08* (2006.01)
  *F16G 5/20* (2006.01)

(52) U.S. Cl.
  CPC ........ *D06M 15/55* (2013.01); *D06M 15/564* (2013.01); *F16G 1/10* (2013.01); *F16G 5/08* (2013.01); *C08L 2201/54* (2013.01); *C08L 2203/12* (2013.01); *C08L 2205/03* (2013.01); *F16G 5/20* (2013.01)

(58) Field of Classification Search
  CPC ........ F16G 5/20; B29D 29/08; B29D 29/00; B29D 29/10; D06M 15/55; D06M 15/513; D06M 15/564; C08L 63/00; C08L 9/08; C08L 75/04; C08L 2201/54; C08L 2203/12; C08L 2205/03
  See application file for complete search history.

(56) References Cited

U.S. PATENT DOCUMENTS

| | | | | |
|---|---|---|---|---|
| 5,268,221 A * | 12/1993 | Nakanishi | .............. | D02G 3/447 474/260 |
| 5,484,322 A * | 1/1996 | Nagai | .............. | B29D 29/00 474/260 |
| 6,132,328 A * | 10/2000 | Kinoshita | .............. | F16G 5/20 474/260 |
| 6,176,799 B1 * | 1/2001 | Kinoshita | .............. | F16G 5/20 474/260 |
| 6,358,609 B2 * | 3/2002 | Kinoshita | .............. | F16G 5/06 428/167 |
| 6,528,113 B1 * | 3/2003 | Watanabe | .............. | D06M 15/693 427/407.1 |
| 6,758,779 B2 * | 7/2004 | Fujimoto | .............. | C08L 23/16 474/263 |
| 7,682,274 B2 * | 3/2010 | Akiyama | .............. | F16G 1/28 428/377 |
| 7,780,560 B2 * | 8/2010 | Lofgren | .............. | F16G 1/10 474/263 |
| 8,147,365 B2 * | 4/2012 | Matsuda | .............. | F16G 1/28 474/263 |
| 8,329,282 B2 * | 12/2012 | Sueto | .............. | F16G 1/10 428/167 |
| 8,956,723 B2 * | 2/2015 | Ogaki | .............. | C03C 25/50 524/508 |
| 8,974,336 B2 * | 3/2015 | Nakashima | .............. | F16G 1/10 428/221 |
| 2002/0132692 A1 * | 9/2002 | Knutson | .............. | D02G 3/447 474/263 |
| 2003/0130077 A1 * | 7/2003 | Knutson | .............. | F16G 1/08 474/263 |
| 2005/0119082 A1 * | 6/2005 | Lofgren | .............. | D06M 15/41 156/137 |
| 2007/0249450 A1 * | 10/2007 | Shiriike | .............. | F16G 5/20 474/260 |
| 2007/0259746 A1 * | 11/2007 | Wu | .............. | F16G 1/28 474/260 |
| 2009/0075770 A1 * | 3/2009 | Yoshida | .............. | F16G 1/28 474/260 |
| 2010/0105510 A1 * | 4/2010 | Ohno | .............. | F16G 5/20 474/260 |
| 2011/0070989 A1 * | 3/2011 | Duke | .............. | D02G 3/447 474/260 |
| 2011/0129647 A1 * | 6/2011 | Duke, Jr. | .............. | D06M 15/568 428/296.4 |
| 2012/0021860 A1 * | 1/2012 | Matsuda | .............. | F16G 1/08 474/260 |
| 2013/0225346 A1 * | 8/2013 | Gibson | .............. | F16G 1/08 156/137 |
| 2014/0073468 A1 * | 3/2014 | Knutson | .............. | D02G 3/44 57/17 |
| 2014/0093729 A1 * | 4/2014 | Furusawa | .............. | F16G 5/20 523/205 |
| 2015/0369335 A1 * | 12/2015 | Ishiguro | .............. | C08L 7/00 474/260 |
| 2016/0010722 A1 * | 1/2016 | Kim | .............. | F16G 1/10 474/271 |
| 2017/0029578 A1 * | 2/2017 | Wu | .............. | D06M 15/564 |
| 2018/0313028 A1 * | 11/2018 | Tomoda | .............. | F16G 1/28 |
| 2019/0145493 A1 * | 5/2019 | Doisneau | .............. | C09J 7/29 474/260 |

FOREIGN PATENT DOCUMENTS

| | | |
|---|---|---|
| JP | H08-100370 A | 4/1996 |
| JP | 2001-073247 A | 3/2001 |
| JP | 2001064840 A | 3/2001 |
| JP | 2003-221787 A | 8/2003 |
| JP | 2005-171431 A | 6/2005 |
| JP | 2016-145440 A | 8/2016 |
| JP | 2017-226717 A | 12/2017 |

OTHER PUBLICATIONS

May 26, 2020—International Search Report—Intl App PCT/JP2020/009638.

Dec. 2, 2022—(CN) Notification of First Office Action—202080021591.4.

* cited by examiner

TREATMENT AGENT FOR CORE WIRES FOR TRANSMISSION BELTS, AND CORE WIRE AND METHOD FOR PRODUCING SAME

CROSS REFERENCE TO RELATED APPLICATIONS

This is a U.S. National Phase Application under 35 U.S.C. § 371 of International Application No. PCT/JP2020/009638, filed Mar. 6, 2020, which claims priority to Japanese Application Nos. 2019-051513, filed Mar. 19, 2019, and 2020-033980, filed Feb. 28, 2020, which were published Under PCT Article 21(2), the entire contents of which are incorporated herein by reference.

TECHNICAL FIELD

The present invention relates to a treatment agent useful for forming a cord for a power transmission belt, a cord treated with such a treatment agent, and a method for producing the same.

BACKGROUND ART

Twisted cords of polyester fibers or aromatic polyamide fibers are widely used as a cord of a power transmission belt. These cords are used by impregnating and adhering an adhesive component such as an epoxy compound, an isocyanate compound, an RFL treatment liquid (resorcin-formalin-latex liquid), or a rubber glue in order to improve adhesiveness between fibers or elastomer in which a cord is embedded. These adhesive components are cured by heating or the like to form a strong adhesive coating film, but when the brittleness of the adhesive coating film is too high, there is a problem that the bending fatigue resistance of the cord is reduced and the life of a power transmission belt is reduced, and improvement is required.

For example, Patent Literature 1 discloses a method for producing an aramid cord that includes a first treatment step of treating an untreated twisted yarn cord containing a para-aramid fiber with a first treatment agent containing a modified epoxy resin modified with an elastic polymer, a latent curing agent, and an organic solvent. Patent Literature 1 describes that, by such a treatment, both the fraying resistance and the bending fatigue resistance can be efficiently achieved, and the adhesiveness to the rubber in which the cord is embedded is also excellent.

As described in Patent Literature 1, a treatment agent containing an organic solvent is often used for the cord adhesion treatment. This is because, by using the treatment agent containing an organic solvent, it is possible to efficiently impregnate and adhere the adhesive component between the fibers or the surface of the fibers. However, in recent years, from the viewpoint of environmental load, there has been a demand for reducing the use of an organic solvent, and attempts have been made to use an adhesive treatment agent using an aqueous solvent.

For example, Patent Literature 2 describes that an object is to obtain an aramid fiber cord having good strength and fatigue properties in which occurrence of fraying of a single yarn of an aramid fiber exposed on a belt end surface is prevented, and adhesiveness to a matrix rubber is improved. The aramid fiber is impregnated with a treatment liquid containing a polyepoxy compound, the heat-treated aramid fiber is twisted, impregnated with an RFL treatment liquid, heat-treated, and further treated with the RFL treatment liquid. In examples, an aqueous treatment liquid containing glycerin diglycidyl ether is used. The literature describes that a polyglycidyl ether compound of polyhydric alcohol is preferable as a polyepoxy compound, and also describes that a polyepoxy compound (A) and a blocked isocyanate (B) may be used in a ratio of 0.05<(A)/[(A)+(B)]<0.9 (weight ratio), but details of the blocked isocyanate are not described and the blocked isocyanate is not used in examples. Since the polyepoxy compound is a polyhydric alcohol polyglycidyl ether, the fraying resistance and the adhesiveness to the matrix rubber are still insufficient.

Patent Literature 3 describes that an object of the invention is to provide a method for producing a polyester cord for reinforcing a power transmission belt, which can greatly improve the bundling property (fraying, dispersibility) of a cord of a filament single fiber exposed at an end face of a belt, prevent a decrease due to steam exposure in adhesion to a rubber, and obtain a belt having excellent strength and fatigue resistance, by using an aqueous adhesive in consideration of the environment. Patent Literature 3 discloses the method for producing a polyester cord for reinforcing a power transmission belt, in which, in producing a polyester cord for reinforcing a rubber, a polyester fiber is twisted to form a cord, a first adhesive treatment liquid is applied to the cord, then a heat treatment is performed, a second adhesive treatment liquid is applied, and then a heat treatment is performed. A treatment liquid obtained by mixing 20 parts by weight to 30 parts by weight of an aqueous urethane resin (A), 10 parts by weight to 25 parts by weight of a polyepoxide compound (B), 30 parts by weight to 40 parts by weight of a blocked polyisocyanate compound (C), and 20 parts by weight to 30 parts by weight of a rubber latex (D) is used as the first adhesive treatment liquid. A treatment liquid obtained by mixing 5 parts by weight to 20 parts by weight of a blocked polyisocyanate compound (C) and/or an ethyleneimine compound (F) with 100 parts by weight of a mixture (E) including 100 parts by weight of a rubber latex and 16 parts by weight to 25 parts by weight of a resorcin-formalin precondensate is used as the second adhesive treatment liquid. Furthermore. Patent Literature 3 discloses, as the aqueous urethane resin (A), a reaction product of polyester polyols, polyether polyols, and polyisocyanate (preferably aromatic isocyanate). It is described that as the polyepoxide compound (B), a polyglycidyl ether compound of polyhydric alcohol such as sorbitol polyglycidyl ether is preferable.

Although a configuration described in Patent Literature 3 shows a certain effect on the polyester cord, the bending fatigue resistance may not be sufficient. Specifically, in the first adhesion treatment liquid described in Patent Literature 3, the physical properties of an adhesive layer are governed by the aqueous urethane resin (A) and the rubber latex (D), and the adhesive layer is flexible, but the adhesion strength tends to be insufficient. Not only a polyol component of the aqueous urethane resin (A) is soft polyester diol or polyether diol, but also the polyepoxide compound (B) is a polyhydric alcohol-based epoxy compound such as sorbitol polyglycidyl ether, so that there is a concern that fraying resistance, especially fraying resistance under a condition where a high load acts, and adhesiveness to matrix elastomer (or rubber) may be lowered. Furthermore, since the first treatment liquid requires the aqueous urethane resin (A), the polyepoxide compound (B), the blocked polyisocyanate compound (C), and the rubber latex (D), the formulation and preparation of the treatment liquid are complicated.

CITATION LIST

Patent Literature

Patent Document 1: JP-A-2016-145440
Patent Document 2: JP-A-H8-100370
Patent Document 3: JP-A-2003-221787

SUMMARY OF INVENTION

Technical Problem

Accordingly, an object of the present invention is to provide a cord for a power transmission belt excellent in adhesiveness to a matrix rubber, fraying resistance, and bending fatigue resistance even though an adhesive treatment agent containing an aqueous solvent having a small environmental load is used, a treatment agent for a cord for obtaining such a cord, and a method for producing the cord.

Another object of the present invention is to provide a cord useful for preparing a power transmission belt that can achieve both the fraying resistance and the bending fatigue resistance even under high load conditions, a treatment agent for the cord, and a method for producing the cord.

Still another object of the present invention is to provide a cord having high durability and high strength retention even with a relatively simple formulation, a treatment agent for the cord, and a method for producing the cord.

Solution to Problem

As a result of intensive studies to achieve the above object, the present inventors have found that when treating an untreated yarn (twisted yarn cord, etc.) with a first aqueous treatment agent (aqueous solution or aqueous treatment liquid in a form of an aqueous dispersion) containing an epoxy resin (A), a polycarbonate polyol (B), and a blocked polyisocyanate (C), the treatment agent penetrates or impregnates between fibers and between raw yarns even when the untreated yarn is a twisted yarn cord obtained by twisting, and thus, high fraying resistance and bending fatigue resistance can be imparted, and adhesiveness to a rubber (or elastomer) can be improved, thereby completing the present invention.

That is, the aqueous treatment agent according to the present invention is an aqueous treatment agent for preparing a cord by treating an untreated yarn for a power transmission belt, and contains at least a first aqueous treatment agent. The first aqueous treatment agent contains an epoxy resin (A), a polycarbonate polyol (B), and a blocked polyisocyanate (C).

The epoxy resin (A) may contain a bisphenol type epoxy resin (A1), the polycarbonate polyol (B) may contain a polycarbonate diol (B1), and the blocked polyisocyanate (C) may contain at least one blocked polyisocyanate selected from the group consisting of an aliphatic polyisocyanate or derivatives thereof and an aromatic polyisocyanate and having a dissociation temperature of 120° C. to 180° C.

Furthermore, the epoxy resin (A) may have an epoxy equivalent of about 450 g/eq to 5000 g/eq in terms of solid content or non-volatile content, the polycarbonate polyol (B) may have a hydroxyl group equivalent of about 200 g/eq to 600 g/eq in terms of solid content or non-volatile content, and the blocked polyisocyanate (C) may have an isocyanate group equivalent of about 200 g/eq to 600 g/eq in terms of solid content or non-volatile content.

Furthermore, a molar ratio of a hydroxyl group of the epoxy resin (A) to a hydroxyl group of the polycarbonate polyol (B) may be about 45/55 to 95/5 of the former/latter. A ratio of an isocyanate group of the blocked polyisocyanate (C) to 1 mol of a total amount of the hydroxyl groups of the epoxy resin (A) and the polycarbonate polyol (B) may be about 0.7 mol to 1.3 mol.

The first aqueous treatment agent may further contain a curing agent, and the curing agent may contain an imidazole-based curing agent.

Although a detailed mechanism such as an adhesion mechanism of such an aqueous treatment agent (first aqueous treatment agent) is not clear, when an untreated yarn is treated, first, the first aqueous treatment agent is impregnated and cured between the fibers and adhesion between the fibers is given. In this adhesion, an adhesive layer between fibers is excellent in adhesion strength due to the epoxy resin (A), and can introduce a polycarbonate polyol skeleton (which may function as a soft segment) into an epoxy resin skeleton (which may function as a hard segment) by the polycarbonate polyol (B) and the blocked polyisocyanate (C), so that toughness is improved and adhesion durability under dynamic conditions is also excellent. Furthermore, a surface of the chemically inert untreated yarn is coated with the adhesive layer, and an epoxy group, a hydroxyl group, an isocyanate group, and a urethane bond are introduced, whereby the adhesiveness to a rubber is improved. Therefore, when used as the cord of the power transmission belt, it is possible to greatly improve the fraying resistance of a cut end face of a belt width, the bending fatigue resistance of the cord, and the adhesiveness between the cord and the rubber.

In the present invention, the aqueous treatment agent may further contain a second aqueous treatment agent, and the second aqueous treatment agent may contain resorcin, formaldehyde, and latex. When treated with such a second aqueous treatment agent (second aqueous treatment liquid), a strong coating film is formed by a reaction between a condensate of resorcin and formaldehyde (a condensate having a methylol group, etc.) and the epoxy resin (A) and/or the blocked polyisocyanate (C).

The cord for a power transmission belt can be produced by treating an untreated yarn with at least the aqueous treatment agent. In this method, after the untreated yarn is treated with the first aqueous treatment agent of the aqueous treatment agent, the yarn may be further treated with the second aqueous treatment agent containing resorcin, formaldehyde, and latex to produce a cord.

Furthermore, the present invention also includes a cord for a power transmission belt including at least an untreated yarn treated with the aqueous treatment agent. The cord is treated with at least the first aqueous treatment agent of the aqueous treatment agent, and may be a cord containing an untreated yarn sequentially treated with the first aqueous treatment agent of the aqueous treatment agent and the second aqueous treatment agent containing resorcin, formaldehyde, and latex. The untreated yarn may contain at least one selected from the group consisting of an aramid fiber and a polyester fiber, and the untreated yarn may contain a para-aramid fiber. Furthermore, the untreated yarn may be a raw yarn formed of a plurality of filaments, but even a twisted yarn cord can be efficiently treated.

The present invention further includes a power transmission belt including the cord for a power transmission belt. In this power transmission belt, the cord for a power transmission belt is often embedded in a vulcanized rubber layer.

In the present specification, the term "epoxy resin" may be used in the same meaning as the term "epoxy compound". The fiber or yarn (raw yarn and/or cord (or twisted yarn cord)) to be treated with the first treatment agent may be simply referred to as an untreated yarn. A numerical range "XX to YY" means that the numerical range includes the numerical value "XX" and the numerical value "YY", that is, the numerical range is equal to the numerical value "XX" or more and the numerical value "YY" or less.

Advantageous Effects of Invention

In the present invention, although an adhesive treatment agent containing an aqueous solvent having a small environmental load is used, it is possible to obtain a cord for a power transmission belt excellent in adhesiveness to a matrix rubber (or elastomer), fraying resistance, and bending fatigue resistance since the adhesive treatment agent contains an epoxy resin (A), a polycarbonate polyol (B), and a blocked polyisocyanate (C). When the cord is used, it is possible to prepare a power transmission belt that can achieve both the fraying resistance and the bending fatigue resistance even under high load conditions. Furthermore, even with a relatively simple formulation, a cord having high durability and high strength retention can be obtained.

DESCRIPTION OF EMBODIMENTS

Hereinafter, an embodiment of the present invention is described in detail with reference to the accompanying drawings as necessary.

[Treated Yarn]

Examples of a fiber (reinforcing fiber) forming a cord (tension member) include a natural fiber (cotton, hemp, etc.), a regenerated fiber (rayon, acetate, etc.), a synthetic fiber (a polyolefin fiber such as polyethylene and polypropylene, a fluororesin fiber such as polyfluoroethylene, an acrylic fiber, a vinyl alcohol fiber such as polyvinyl alcohol, a polyamide fiber, a polyester fiber, a fully aromatic polyester fiber, an aramid fiber, etc.), and an inorganic fiber (a carbon fiber, a glass fiber, etc.). These fibers may be used alone or in combination of two or more.

Preferred examples of the fiber (reinforcing fiber) include a fiber having a high elastic modulus, for example, a high strength polyethylene fiber, a polyparaphenylene benzobisoxazole (PBO) fiber, a polyester fiber [a $C_{2-4}$ alkylene $C_{6-14}$ arylate fiber such as a polyethylene terephthalate (PET) fiber, a polypropylene terephthalate (PPT) fiber, a polytrimethylene terephthalate (PTT) fiber, a polybutylene terephthalate (PBT) fiber, or a polyethylene naphthalate (PEN) fiber, a polyarylate fiber, etc.], and a polyamide fiber (an aromatic polyamide fiber such as an aramid fiber, etc.). These fibers may be used alone or in combination of two or more.

Among these fibers (reinforcing fibers), the polyester fiber (the PET fiber, the PEN fiber, the polyarylate fiber, and the like) and/or the aramid fiber or the aromatic polyamide fiber (a para-aramid fiber, a meta-aramid fiber, etc.) are often used. In particular, in a power transmission belt on which a high load acts, the aramid fiber (in particular, the para-aramid fiber) is preferable. Furthermore, according to the present invention, since the adhesiveness to the reinforcing fiber can be improved, the fraying resistance and the bending fatigue resistance can be effectively improved even for a poorly adhesive fiber having poor adhesiveness. Therefore, the present invention is effective for application to an aramid fiber (particularly, a para-aramid fiber having high strength and high elastic modulus).

Examples of the para-aramid fiber include a polyparaphenylene terephthalamide fiber (e.g., "Twaron (registered trademark)" manufactured by Teijin Limited, "Kevlar (registered trademark)" manufactured by Du Pont-Toray Co., Ltd.) and a copolymer fiber having a paraphenylene terephthalamide unit and a 3,4'-oxydiphenylene terephthalamide unit (e.g., "Technola (registered trademark)" manufactured by Teijin Limited).

The tensile elastic modulus of the fiber (reinforcing fiber) can be selected from a range of, for example, about 0.01 GPa to 500 GPa (e.g., 0.1 GPa to 300 GPa), and in order to impart high tensile strength to the power transmission belt, the tensile elastic modulus of the fiber (reinforcing fiber) is preferably high. The tensile elastic modulus of the fiber (reinforcing fiber) may be, for example, about 1 GPa to 500 GPa (e.g., 5 GPa to 400 GPa), preferably about 10 GPa to 300 GPa (e.g., 25 GPa to 250 GPa), may be about 50 GPa or more (e.g., 60 GPa to 500 GPa, preferably 70 GPa to 400 GPa, and more preferably 100 GPa to 300 GPa), and may be usually about 60 GPa to 150 GPa (e.g., 65 GPa to 120 GPa). The fiber having such high elastic modulus includes, for example, an aramid fiber.

The average fineness of the fiber (reinforcing fiber or monofilament yarn) may be, for example, about 0.1 dtex to 10 dtex (e.g., about 0.3 dtex to 7 dtex), preferably about 0.5 dtex to 5 dtex (e.g., about 0.7 dtex to 3 dtex), and more preferably about 1 dtex to 2.5 dtex (e.g., about 1.2 dtex to 2 dtex).

The fiber (para-aramid fiber, etc.) can be used in a form of a multifilament yarn (raw yarn) including a plurality of monofilaments, and from the viewpoint of durability of the power transmission belt, the number of monofilaments in the multifilament yarn (raw yarn) can be selected from a range of, for example, about 100 to 50000 (e.g., 200 to 10000), and may be about 250 to 5000 (e.g., 300 to 3000), and more preferably about 350 to 2000 (e.g., 400 to 1500). The multifilament yarn (raw yarn) preferably contains at least an aramid fiber, and may contain a monofilament yarn of another fiber (e.g., a polyester fiber). The ratio of the aramid fiber is 50% by mass or more (particularly 80% by mass to 100% by mass) with respect to the entire monofilament yarn (multifilament yarn), and the entire monofilament yarn is usually formed of the aramid fiber.

The untreated yarn can be usually used in a form of a twisted cord or a twisted yarn cord (untreated twisted yarn cord) obtained by twisting a multifilament yarn (raw yarn) in order to increase tensile strength. That is, in many cases, the cord is used as a cord, for example, a twisted cord (twisted yarn cord) in which these multifilament yarns are used as a core yarn (untwisted yarn, preferably a primary twisted yarn) and finally twisted in a predetermined direction (e.g., the same direction as or a direction opposite to the primary twisted yarn). The average diameter (average wire diameter)

of the core yarn may be, for example, about 0.1 mm to 1.2 mm (e.g., 0.2 mm to 1 mm), preferably about 0.3 mm to 0.8 mm (e.g., 0.4 mm to 0.7 mm), and the average diameter (average wire diameter) of the twisted yarn cord (or the cord) may be, for example, about 0.1 mm to 3.5 mm (e.g., 0.2 mm to 3 mm), preferably about 0.3 mm to 2.5 mm (e.g., 0.35 mm to 2 mm), more preferably about 0.4 mm to 2 mm (e.g., 0.5 mm to 1.5 mm), particularly preferably about 0.5 mm to 1 mm.

The twisted yarn cord (untreated twisted yarn cord) may be a twisted yarn cord (single twisted yarn) formed by twisting at least one raw yarn right (S-twist) or left (Z-twist), but from the viewpoint of strength, a twisted yarn cord obtained by twisting a plurality of raw yarns is preferable. The twisted yarn cord formed by twisting a plurality of raw yarns may be a yarn (e.g., plied yarn, Koma twist yarn or Lang lay yarn) obtained by secondary twisting a plurality of single twisted yarns as a primary twisted yarn, or may be a yarn (e.g., corkscrew yarn) formed by aligning and twisting a single twisted yarn and a raw yarn (untwisted yarn). A single twist direction (primary twist direction) and a secondary twist direction may be either the same direction (Lang twist) or an opposite direction (plied twist). Among these twisted yarn cords, a twisted yarn cord (plied yarn or Lang lay yarn) in which a plurality of single twisted yarns are used as a primary twisted yarn and secondarily twisted in two stages is preferable in terms of prevention of untwisting and excellent bending fatigue resistance.

The number of the primary twisted yarns constituting the twisted yarn may be, for example, about 2 to 5, preferably about 2 to 4, and more preferably about 2 to 3. The number of twists of the primary twist may be, for example, about 20 times/m to 300 times/m, preferably about 30 times/m to 200 times/m, and more preferably about 50 times/m to 180 times/m (particularly about 100 times/m to 150 times/m). In the primary twist, a twist factor (T.F.) represented by the following formula (1) can be selected from a range of, for example, about 0.01 to 10, and is preferably about 1 to 6 in the case of a plied yarn, and about 0.2 to 2 in the case of a Lang lay yarn.

$$\text{Twist factor(T.F.)} = [\text{Number of twists(times/m)} \times \sqrt{\text{Total fineness(tex)}}]/960 \quad (1)$$

The number of twists of the secondary twist is not particularly limited, and may be, for example, about 30 times/m to 200 times/m, preferably about 40 times/m to 180 times/m, and more preferably about 50 times/m to 150 times/m (e.g., about 60 times/m to 100 times/m). In the secondary twist, the twist factor (T.F.) represented by the formula (1) can be selected from a range of, for example, about 0.01 to 10, and is preferably about 1 to 6 in the case of a piled yarn and about 2 to 5 in the case of a Lang lay yarn.

In a case where a twisted configuration of a twisted yarn cord formed by twisting a plurality of raw yarns is represented by (the number of raw yarns aligned in primary twist)×(the number of primary twisted yarns aligned in secondary twist), the twisted yarn cord may be a twisted yarn cord having a configuration of 1×2, 1×3, 1×5, 2×3, 2×5, 3×5, etc.

In the present invention, the reinforcing fiber may be treated with a first treatment agent to form a raw yarn (multifilament yarn or twisted yarn), but in many cases, a raw yarn and/or a cord (hereinafter, may be simply referred to as an untreated yarn) is treated. The untreated yarn may be in a state of an untwisted raw yarn (untreated raw yarn), or may be in a state of a twisted yarn formed by twisting a raw yarn (untreated twisted yarn cord). Since the untreated twisted yarn cord is formed by twisting the raw yarn and the fiber, the untreated twisted yarn cord has a property that the first treatment agent is less likely to penetrate between the filaments (fibers) inside the untreated twisted yarn cord. Therefore, in the untreated twisted yarn cord, usually, the treatment agent cannot firmly adhere to the filaments inside the cord, and the adhesion to the rubber tends to be lowered. On the other hand, it is also conceivable to treat a raw yarn with a treatment agent and twist the raw yarn to produce a twisted yarn cord, which is further treated with a treatment agent. In this method, although fraying and adhesiveness are improved, the flexibility of the fiber is impaired and the bending fatigue resistance tends to be lowered. Since a treatment process is provided before and after the twisted yarn, the process becomes complicated, and when the treatment agent adheres to the raw yarn, the adhesiveness is increased and the twisted yarn workability is also decreased. In the present invention, since the permeability of the first treatment agent is excellent, even when the twisted yarn cord is used, the permeability or impregnability into the cord (between the monofilaments (or between the fibers) and/or between the multifilaments (or between the raw yarns)) can be improved, and the adhesion to the rubber can also be improved. Therefore, in the present invention, the untreated yarn of the cord for a power transmission belt exhibits an excellent effect regardless of whether the untreated yarn is a raw yarn or a twisted yarn cord, and it is particularly effective in treating the twisted yarn cord.

In the present invention, even in the case of the twisted yarn cord, it is possible to improve the fraying resistance, the bending fatigue resistance, and the adhesiveness to a rubber since the specific first treatment agent having excellent impregnability or permeability into the cord (between the monofilaments and/or between the multifilament yarns of the reinforcing fiber) is used. In particular, even when the twisted yarn cord is formed of a multifilament yarn containing a para-aramid fiber (in particular, a multifilament yarn composed of a monofilament yarn of a para-aramid fiber), it is possible to effectively prevent the fibers from fraying on a side surface of the power transmission belt, and to improve the bending fatigue resistance of the power transmission belt.

The reinforcing fiber, the raw yarn (multifilament yarn), and/or the cord may be pretreated with a silane coupling agent, an RFL treatment liquid, or the like, if necessary.

[First Treatment Agent]

The treated yarn (twisted cord, etc.) is treated with at least the first treatment agent (first aqueous treatment agent), and the first treatment agent contains an epoxy resin (A), a polycarbonate polyol (B), and a blocked polyisocyanate (C) to form an aqueous treatment agent. The first treatment agent permeates or impregnates between the monofilaments of the reinforcing fibers and/or the multifilament yarn (raw yarn) to firmly bond the reinforcing fibers and the raw yarn, fiber fraying resistance on a power transmission surface (e.g., a frictional power transmission surface of a frictional power transmission belt such as a V-ribbed belt) is high, and the bending fatigue resistance can be greatly improved.

In the following description, an epoxy equivalent can be measured in accordance with a method defined in JIS K7236 (2009). A hydroxyl group value and an acid value can be measured in accordance with a method defined in JIS K0070 (1992). The molecular weight can be measured by using gel permeation chromatography (GPC) as a molecular weight in terms of polystyrene. The hydroxyl group equivalent can be converted from the hydroxyl group value.

[Epoxy Resin (A)]

The epoxy resin (epoxy compound) (A) usually has a plurality of epoxy groups (oxirane rings or glycidyl groups) in one molecule in many cases, and may be a glycidyl ether type epoxy resin, a glycidyl ester type epoxy resin (glycidyl ester of a polyvalent carboxylic acid (e.g., aromatic polyvalent carboxylic acid) such as diglycidyl phthalate or diglycidyl hexahydrophthalate), a glycidyl amine type epoxy resin (a resin obtained by glycidylating an amino group of an amino compound (e.g., aromatic amine) such as tetraglycidyl aminodiphenylmethane or triglycidyl-p-aminophenol), an alicyclic epoxy resin (an epoxy resin obtained by epoxidizing a double bond of a cycloalkene ring such as a cycloalkenene oxide type epoxy resin such as cyclohexene oxide or a dicyclopentadiene type epoxy resin), a heterocyclic epoxy resin (triglycidyl isocyanurate, etc.), or the like. Examples of the glycidyl ether type epoxy resin include aliphatic epoxy resins (e.g., polyglycidyl ethers of polyols such as diols such as ethylene glycol, propylene glycol, neopentyl glycol, polyethylene glycol, and polypropylene glycol, and triols such as glycerin), alicyclic epoxy resins (e.g., cycloalkanediol diglycidyl ethers such as cyclohexanedimethanol diglycidyl ether, and crosslinked cyclic epoxy resins such as dicyclopentadiene diol diglycidyl ether), and aromatic epoxy resins. The epoxy resin preferably contains an aromatic epoxy resin.

Examples of the aromatic epoxy resin include arene type epoxy resins (benzene type epoxy resins such as diglycidyloxybenzene, naphthalene type epoxy resins such as diglycidyloxynaphthalene and bis(2,7-dihydroxynaphthalene) methyltetraglycidyl ether, etc.), novolak type epoxy resins (phenol novolak type epoxy resins, cresol novolak type epoxy resins, etc.), and bisphenol type epoxy resins. The epoxy resin preferably contains a bisphenol type epoxy resin (A1) which has a rigid skeleton and thus has excellent mechanical strength of a cured product, and has a hydroxyl group in a molecule and thus can be crosslinked by a polyisocyanate.

In the bisphenol type epoxy resin (A1), examples of the bisphenols include bisphenols (4,4'-dihydroxybiphenyl, etc.), bis(hydroxyphenyl)alkanes [e.g., bis(hydroxyphenyl) $C_{1-10}$ alkanes such as bis(4-hydroxyphenyl)methane (bisphenol F), 1,1-bis(4-hydroxyphenyl)ethane (bisphenol AD), 2,2-bis(4-hydroxyphenyl)propane (bisphenol A), 2,2-bis(4-hydroxy-3-methylphenyl)propane, 2,2-bis(4-hydroxyphenyl)butane, 2,2-bis(4-hydroxyphenyl)octane, 2,2-bis(3,5-dimethyl-4-hydroxyphenyl)propane, 2,2-bis(3-cyclohexyl-4-hydroxyphenyl)propane, bis(4-hydroxyphenyl)diphenylmethane, 2,2-bis(3,5-dichloro-4-hydroxyphenyl)propane, 2,2-bis(3,5-dibromo-4-hydroxyphenyl)propane], bis(hydroxyphenyl)cycloalkanes (e.g., 1,1-bis(4-hydroxyphenyl)cyclohexane, 1,1-bis(4-hydroxyphenyl)-3,3,5-trimethylcyclohexane), bis(hydroxyphenyl) ethers (e.g., 4,4'-dihydroxydiphenyl ether), and bis(hydroxyphenyl) sulfones (e.g., 4,4'-dihydroxydiphenylsulfone), bis(hydroxyphenyl) sulfoxides (e.g., 4,4'-dihydroxydiphenyl sulfoxide), and bis(hydroxyphenyl) sulfides (e.g., 4,4'-dihydroxydiphenyl sulfide).

Furthermore, the epoxy resin also includes a phenoxy resin which is a high molecular weight bisphenol type epoxy resin (such as a bisphenol A type epoxy resin).

These epoxy resins may be used alone or in combination of two or more.

Among these epoxy resins, an aliphatic epoxy resin is likely to have a decrease in durability, and thus an aromatic epoxy resin (a glycidyl ether type epoxy resin, etc.) is usually used in many cases, and a bisphenol type epoxy resin (a bisphenol F type epoxy resin and/or a bisphenol A type epoxy resin) (A1) is preferable from the viewpoint of excellent adhesiveness to a reinforcing fiber (para-aramid fiber, etc.).

The epoxy resin may usually have two or more (e.g., 2 to 10, preferably 2 to 6, more preferably 2 to 4, and particularly about 2 or 3) epoxy groups in the molecule. The epoxy equivalent of such an epoxy resin can be selected from a range of, for example, about 100 g/eq to 15000 g/eq (e.g., 150 g/eq to 10000 g/eq) depending on the type of the epoxy resin, and may be usually about 200 g/eq to 5000 g/eq (e.g., 250 g/eq to 3000 g/eq or 450 g/eq to 5000 g/eq), preferably about 300 g/eq to 2500 g/eq (e.g., 400 g/eq to 2000 g/eq), more preferably about 450 g/eq to 1500 g/eq (e.g., 500 g/eq to 1000 g/eq), or about 400 g/eq to 4500 g/eq (e.g., 500 g/eq to 3500 g/eq). In particular, the epoxy equivalent of the bisphenol type epoxy resin (typically bisphenol A type epoxy resin) may be about 450 g/eq to 5000 g/eq (e.g., about 600 g/eq to 4500 g/eq), preferably about 700 g/eq to 4000 g/eq (e.g., about 750 g/eq to 3500 g/eq), more preferably about 800 g/eq to 3300 g/eq (e.g., about 900 g/eq to 3000 g/eq), and particularly about 1200 g/eq to 2700 g/eq (e.g., about 1500 g/eq to 2500 g/eq). When the epoxy equivalent is too large, the reactivity may be decreased and the force for bonding the fibers may be decreased, and when the epoxy equivalent is too small, the heat resistance and bending fatigue resistance of the belt may be decreased.

Furthermore, the epoxy resin may be a monomer or a multimer (e.g., a 2 to 15-mers, preferably a 2 to 10-mers), and may be a mixture of the monomer and the multimer. The epoxy resin preferably has a hydroxyl group (secondary hydroxyl group). That is, the epoxy resin preferably contains at least a multimer.

The weight average molecular weight of the epoxy resin can be selected from a range of, for example, about 300 to 60000 (e.g., 400 to 30000), and may be about 500 to 10000 (e.g., 750 to 7500), preferably about 900 to 5500 (e.g., 100 to 5000), more preferably about 1500 to 4000 (e.g., 1600 to 4000), and particularly about 2000 to 3700 (e.g., 2500 to 3500).

The epoxy resin may be liquid or viscous at a room temperature (20° C.), or may be solid. A softening temperature of the solid epoxy resin may be about 60° C. to 170° C. (e.g., 70° C. to 160° C.), preferably about 80° C. to 155° C. (e.g., 90° C. to 150° C.), and more preferably about 100° C. to 145° C. (e.g., 110° C. to 140° C.) in a ring and ball method.

The epoxy resin may be in the form of an aqueous solution dissolved in an aqueous medium, and is usually an aqueous dispersion dispersed in an aqueous medium in many cases.

Examples of the epoxy resin (e.g., bisphenol A type epoxy resin which is solid at a room temperature) include "jER (registered trademark) 1007", "jER (registered trademark) 1009F", and "jER (registered trademark) 1007F" manufactured by Mitsubishi Chemical Corporation. Examples of the aqueous dispersion of such an epoxy resin include "Yuka Resin (registered trademark) KE-307E" and "Yuka Resin (registered trademark) NE-307H" manufactured by Yoshimura Oil Chemical Co., Ltd.

The epoxy resin is effective for improving the adhesiveness of the cord (the adhesiveness between the reinforcing fibers, the adhesiveness between the raw yarns, and the adhesiveness to elastomer (or rubber)), but a cured coating film of the epoxy resin represented by the aromatic epoxy resin has relatively high brittleness (brittleness), and there is a concern that the bending fatigue resistance may be reduced. In the present invention, even when an epoxy resin (e.g., bisphenol type epoxy resin) that forms a brittle cured coating film is used, the adhesiveness of the reinforcing fiber and the raw yarn that form the cord can be improved and the toughness can also be improved by combining with a polycarbonate polyol and a polyisocyanate. For this reason, in the present invention, both the fraying resistance and the bending fatigue resistance can be achieved, and the adhesiveness of the power transmission belt to the matrix elastomer (or rubber) can also be improved.

[Polycarbonate Polyol (B)]

The polycarbonate polyol (B) is obtained by a reaction between polyol and carbonates (dialkyl carbonates, alkylene carbonates, etc.). The polyol contains at least diol, and a branched structure may be introduced by using polyol (alkanepolyol such as glycerin, trimethylolpropane, pentaerythritol, etc.) in combination.

Examples of the diol include $C_{2-10}$ alkanediols such as ethylene glycol, propylene glycol, trimethylene glycol, 1,4-butanediol, 1,6-hexanediol, neopentyl glycol, 3-methyl-1,5-pentanediol, and octanediol, and polyalkylene glycols such as diethylene glycol and dipropylene glycol. As the diol, aromatic diol (e.g., bisphenol such as bisphenol A or an ethylene oxide adduct thereof), alicyclic diol (e.g., cyclohexanedimethanol), or the like may be used in combination.

The diol contains, for example, $C_{2-10}$ alkanediol such as 1,6-hexanediol in many cases. Therefore, the polycarbonate polyol (B) preferably contains a polycarbonate diol (B1).

An average number of functional groups (the number of hydroxyl groups) of the polycarbonate polyol may be at least about 2, preferably about 2 to 6, and more preferably about 2 to 4 (e.g., about 2 to 3).

The hydroxyl group value of the polycarbonate polyol can be selected from a range of about 30 mgKOH/g to 500 mgKOH/g (e.g., 50 mgKOH/g to 400 mgKOH/g), and may be, for example, about 80 mgKOH/g to 500 mgKOH/g (e.g., 100 mgKOH/g to 400 mgKOH/g), preferably about 120 mgKOH/g to 350 mgKOH/g (e.g., 150 mgKOH/g to 300 mgKOH/g), and more preferably about 170 mgKOH/g to 270 mgKOH/g (e.g., 200 mgKOH/g to 250 mgKOH/g).

The hydroxyl group equivalent of the polycarbonate polyol can be selected from a range of, for example, about 200 g/eq to 2000 g/eq (e.g., 230 g/eq to 1700 g/eq), and may be about 200 g/eq to 1000 g/eq (e.g., 220 g/eq to 800 g/eq), preferably about 200 g/eq to 600 g/eq (e.g., 230 g/eq to 550 g/eq), and more preferably about 200 g/eq to 300 g/eq (e.g., 230 g/eq to 275 g/eq). When the hydroxyl group equivalent is too small, the toughness of the adhesive coating film due to the epoxy resin becomes insufficient, and when the hydroxyl group equivalent is too large, the adhesion strength may be decreased. The hydroxyl group equivalent can be calculated based on the hydroxyl value and based on the formula: hydroxyl group equivalent=1/[(hydroxyl group value mgKOH/g)/1000/56.1].

The number average molecular weight of the polycarbonate polyol can be selected from a range of, for example, about 150 to 5000 (e.g., 175 to 4000), and may be about 200 to 3000 (e.g., 225 to 2500), preferably about 250 to 2000 (e.g., 300 to 1500), and more preferably about 400 to 1000 (e.g., 300 to 700).

These polycarbonate polyols (B) may be used alone or in combination of two or more thereof. The polycarbonate polyol (B) can form an adhesive coating film having high toughness, and can effectively improve the fraying resistance and the bending fatigue resistance.

The polycarbonate polyol (B) may be in the form of an aqueous solution dissolved in an aqueous medium, or may be an aqueous dispersion dispersed in an aqueous medium.

As the polycarbonate polyol (B), for example. "UH-50" and "UH-100" of the "ETERNACOLL (registered trademark)" series manufactured by Ube Industries, Ltd., and "976" and "965" of the "Nippolan (registered trademark)" series manufactured by Tosoh Corporation can be used. Examples of the aqueous dispersion of such a polycarbonate polyol include "Yuka Resin (registered trademark) PEP-50" and "Yuka Resin (registered trademark) PEP-90" manufactured by Yoshimura Oil Chemical Co., Ltd.

An amount of the polycarbonate polyol to be used is not particularly limited, and a molar ratio of the hydroxyl group of the epoxy resin (A) to the hydroxyl group of the polycarbonate polyol (B) may be selected from a range of, for example, the former/the latter of about 30/70 to 97/3 (e.g., about 35/65 to 95/5), about 45/55 to 95/5 (e.g., about 50/50 to 92/8), preferably about 45/55 to 93/7 (e.g., about 45/55 to 85/15), more preferably about 55/45 to 90/10 (e.g., about 60/40 to 87/13), still more preferably about 65/35 to 85/15 (e.g., about 70/30 to 80/20), and may be about 50/50 to 85/15 (e.g., about 60/40 to 80/20), particularly about 70/30 to 80/20. When the amount of the epoxy resin (A) is too small, the adhesiveness between the fibers of the cord and between the raw yarns, and the adhesiveness between the elastomers (or rubbers) may be reduced, and when the amount of the epoxy resin (A) is too large, the toughness of the adhesive coating film may be reduced, the fraying resistance and the bending fatigue resistance may be reduced, and the strength retention rate may be reduced.

A ratio of the polycarbonate polyol (B) to the epoxy resin (A) may be about 2.5 parts by mass to 50 parts by mass (e.g., 3 parts by mass to 45 parts by mass), preferably about 5 parts by mass to 40 parts by mass (e.g., 7 parts by mass to 35 parts by mass), more preferably about 8 parts by mass to 30 parts by mass (e.g., 10 parts by mass to 25 parts by mass), or about 7.5 parts by mass to 20 parts by mass (e.g., 10 parts by mass to 15 parts by mass), in terms of solid content, with respect to 100 parts by mass of the epoxy resin (A).

[Blocked Polyisocyanate (C)]

When the blocked polyisocyanate which is protected by a blocking agent is used, the blocked polyisocyanate does not react in the process of dipping or impregnating the cord (reinforcing fiber or raw yarn) in the first treatment agent, and the curing reaction proceeds by heating in the process of vulcanizing the elastomer (or rubber) such as the power transmission belt, so that the operability can be improved.

The polyisocyanate protected by a blocking agent may be any polyisocyanate as long as the polyisocyanate can generate a free (or reactive) isocyanate group by heating, and a polyisocyanate having a plurality of isocyanate groups in one molecule (e.g., diisocyanate) is usually used in many cases. Examples of the polyisocyanate include aliphatic polyisocyanates [diisocyanates such as propylene diisocyanate, trimethylene diisocyanate, tetramethylene diisocyanate, hexamethylene diisocyanate (HDI), trimethylhexamethylene diisocyanate (TMDI), and lysine diisocyanate (LDI); triisocyanates or polyisocyanates such as 1,6,11-undecanetriisocyanatemethyloctane and 1,3,6-hexamethylene triisocyanate]; alicyclic polyisocyanates [diisocyanates such as cyclohexane 1,4-diisocyanate, isophorone diisocyanate (IPDI), hydrogenated xylylene diisocyanate, and hydrogenated bis(isocyanatophenyl)methane; triisocyanates or polyisocyanates such as bicycloheptane triisocyanate]; aromatic polyisocyanates [diisocyanates such as phenylene diisocyanate, tolylene diisocyanate (TDI), xylylene diisocyanate (XDI), tetramethylxylylene diisocyanate (TMXDI), naphthalene diisocyanate (NDI), bis(isocyanatophenyl) methane (MDI), toluidine diisocyanate (TODI), and 1,3-bis (isocyanatophenyl)propane; and triisocyanates or polyisocyanates].

The polyisocyanate may be a derivative such as a multimer (dimer, trimer, tetramer, etc.), an adduct, a modified product (biuret modified product, allophanate modified product, urea modified product, etc.), a urethane oligomer having a plurality of isocyanate groups, or the like. Examples of the modified product or derivative of polyisocyanate include adducts of polyisocyanate (aliphatic polyisocyanate such as hexamethylene diisocyanate) and polyhydric alcohol (trimethylolpropane or pentaerythritol), biuret of the polyisocyanate, and multimers of the polyisocyanate (e.g., aliphatic polyisocyanate) (e.g., polyisocyanate having an isocyanurate ring such as trimer of hexamethylene diisocyanate).

These polyisocyanates may be used alone or in combination of two or more. Among these polyisocyanates, aliphatic polyisocyanates or derivatives thereof (e.g., HDI or trimers thereof), aromatic polyisocyanates (TDI, MDI, etc.), and the like are widely used.

Furthermore, the isocyanate group of the polyisocyanate is protected by a blocking agent to form a blocked polyisocyanate (or thermal reaction type polyisocyanate). When the blocked polyisocyanate is used, the stability in the aqueous medium can be improved since the isocyanate group is protected by the blocking agent, and the treatment efficiency of the cord (the reinforcing fiber and the raw yarn) can be improved since the blocked polyisocyanate is inactive and is not involved in curing in the process of forming the cord. The blocking agent is dissociated by heating, the isocyanate group is activated, and the isocyanate group reacts with the reactive group of the epoxy resin, the polycarbonate polyol and/or the reinforcing fiber (and the raw yarn) to be cured, whereby a cord can be formed with high adhesiveness, and the fraying resistance and the bending fatigue resistance can be improved. Therefore, the adhesiveness of the belt to the elastomer (or rubber) and the abrasion resistance and durability of the belt can be improved. Furthermore, since the treatment agent is an aqueous treatment agent containing polyisocyanate, the preparation of the solution is simple, and the environmental load is small.

As the blocked polyisocyanate, common heat-reactive polyisocyanates can be used. Examples of the blocking agent (protective agent) include $C_{1-24}$ monoalcohols such as methanol, ethanol, and isopropanol or alkylene oxide adducts thereof (e.g., $C_{2-4}$ alkylene oxide adducts such as ethylene oxide); phenols such as phenol, cresol, and resorcin; oximes such as acetoxyme, methyl ethyl ketoxime, and cyclohexane oxime; lactams such as ε-caprolactam and valerolactam; and secondary amines such as dibutylamine and ethyleneimine. These blocking agents may be used alone or in combination of two or more. Among these, oximes, lactams, and the like are widely used. The blocked polyisocyanate (or heat-reactive polyisocyanate) may be in the form of an aqueous solution, but is often in the form of an aqueous dispersion.

The blocked polyisocyanate (heat-reactive isocyanate) may be, for example, a water-soluble blocked polyisocyanate or a water-dispersible blocked polyisocyanate into which a hydrophilic group (an acidic group such as a carboxyl group or a sulfonic acid group or a salt thereof, an oxyethylene group, etc.) is introduced.

The content of the isocyanate group in the blocked polyisocyanate (heat-reactive isocyanate) is not particularly limited, and may be, for example, about 1% by mass to 50% by mass, preferably about 3% by mass to 40% by mass, and more preferably about 5% by mass to 30% by mass.

The isocyanate group equivalent of the blocked polyisocyanate may be about 200 g/eq to 600 g/eq (e.g., 220 g/eq to 570 g/eq), preferably about 250 g/eq to 500 g/eq (e.g., 270 g/eq to 450 g/eq), and more preferably about 300 g/eq to 400 g/eq (e.g., 330 g/eq to 380 g/eq). The isocyanate group equivalent can be calculated based on the number of isocyanate groups and the molecular weight, and can also be calculated from the isocyanate group content I (% by mass) according to the calculation formula: isocyanate group equivalent=42/(I/100).

A dissociation temperature of the blocked polyisocyanate (temperature at which the blocking agent is dissociated and the active isocyanate group is regenerated) is usually equal to or higher than a drying temperature of the cord impregnated with the treatment agent. When the dissociation temperature is high, the drying temperature can be increased, and thus the productivity of the cord can be improved. The dissociation temperature may be, for example, 120° C. or higher (e.g., 140° C. or higher), preferably 150° C. or higher (e.g., 160° C. or higher), or more preferably 170° C. or higher (e.g., 180° C. or higher), and may be, for example, about 120° C. to 250° C. (e.g., 150° C. to 240° C.), preferably 160° C. to 230° C. (e.g., 170° C. to 220° C.), or more preferably 175° C. to 210° C. (e.g., 180° C. to 200° C.). When the dissociation temperature is too low, the drying temperature cannot be increased, so that the drying efficiency may be reduced and the productivity of the cord may be reduced.

The blocked polyisocyanate may be in the form of an aqueous solution dissolved in an aqueous medium, or may be an aqueous dispersion dispersed in an aqueous medium.

Examples of the blocked polyisocyanate (C) include blocked polyisocyanates of a general-purpose diisocyanate (a diisocyanate based polyisocyanate such as hexamethylene diisocyanate (HDI) or a derivative thereof (polyisocyanate having an isocyanurate ring, etc.), diphenylmethane diisocyanate (MDI), etc.) blocked with a general-purpose blocking agent (oximes such as methyl ethyl ketoxime, lactams such as ε-caprolactam, etc.). As the aqueous dispersion of such blocked polyisocyanate, for example, "Yuka Resin (registered trademark) AK-81" manufactured by Yoshimura Oil Chemical Co., Ltd., "BN-27" and "BN-69" of the "Elastron (registered trademark)" series manufactured by Dai-ichi Kogyo Seiyaku Co., Ltd., and the like can be used.

An amount of the blocked polyisocyanate (C) to be used can be selected from a range of about 0.1 mole to 2 mole (e.g., 0.2 mole to 1.8 mole) of the isocyanate group (blocked isocyanate group) of the blocked polyisocyanate with respect to 1 mole of the total amount of the hydroxyl groups of the epoxy resin (A) and the polycarbonate polyol (B), and may be about 0.3 mole to 1.7 mole (e.g., 0.5 mole to 1.5 mole), preferably about 0.7 mole to 1.3 mole (e.g., 0.8 mole to 1.2 mole), more preferably about 0.7 mole to 1.15 mole (e.g., 0.75 mole to 1.1 mole), or about 0.75 mole to 1.25 mole (e.g., 0.9 mole to 1.1 mole).

[Curing Agent]

The first treatment agent according to the present invention may contain a curing agent in addition to the above components. As the curing agent, various curing agents for the epoxy resin can be used, and the curing agent may function as a curing agent for the blocked polyisocyanate.

Examples of the curing agent include amines (amines having at least a primary amino group, amines having a tertiary amino group, etc.), polyamide resins (polyaminoamides having a plurality of amino groups and at least one amide group, polyaminoamides having an imidazole ring, etc.), acid anhydride curing agents (aliphatic acid anhydrides such as dodecenyl succinic anhydride and polyadipic anhydride, alicyclic acid anhydrides such as hexahydrophthalic anhydride, aromatic acid anhydrides such as pyromellitic anhydride and benzophenonetetracarboxylic anhydride, etc.), mercaptan curing agents (mercaptopropionic acid ester, etc.), imidazole-based curing agents, resol phenol resins, amino resins (urea resin, melamine resin, etc.), latent curing agents (dicyandiamides such as dicyandiamide and dicyandiamide-modified polyamine, organic acid hydrazides, Lewis acids (boron trifluoride-amine complexes, etc.), etc.). Examples of the amines include aliphatic amines such as diethylenetriamine, triethylenetetramine, dipropylenediamine, hexamethylenediamine, trimethylhexamethylenediamine, and triethanolamine; alicyclic amines such as menthenediamine, isophoronediamine, bis(aminomethyl)cyclohexane, and bis(aminocyclohexyl)methane; aromatic amines such as phenylenediamine, bis(aminophenyl)methane, bis(4-amino-3-methylphenyl)methane, bis(aminophenyl)sulfone, benzyldimethylamine, 2-(dimethylaminomethyl)phenol, and 2,4,6-tris(dimethylaminomethyl)phenol; aromatic aliphatic amines such as xylylenediamine; heterocyclic amines such as N,N'-dimethylpiperazine, 1,8-diazabicyclo[5.4.0]undecene-7 (DBU), 1,4-diazabicyclo[2.2.2]octane (DABCO), 3,9-bis(3-aminopropyl)-2,4,8,10-tetraoxaspiro[5.5]undecane (ATU), and phthalocyanine tetramine; modified polyamines using these polyamines (adducts to epoxy resin, Michael adduct to unsaturated compound, reaction product with methylol compound).

These curing agents may be used alone or in combination of two or more. The curing agent may be a curing agent that can impart high heat resistance, for example, a curing agent containing at least an imidazole-based curing agent. The imidazole-based curing agent is useful for improving the heat resistance of the adhesive coating film of the cord. In the imidazole-based curing agent, a 2-position of an imidazole ring may be substituted with a substituent such as a linear or branched $C_{1-24}$ alkyl group such as a methyl group, an ethyl group, a propyl group, an isopropyl group, a butyl group, a hexyl group, an octyl group, a decyl group, an undecyl group, a dodecyl group, a tetradecyl group, a hexadecyl group, and an octadecyl group, a $C_{3-10}$ cycloalkyl group such as a cyclohexyl group, and a $C_{6-12}$ aryl group such as a phenyl group and a naphthyl group. The imidazole ring may have a hydrogen atom at a 4-position, and the 4-position may be substituted with a linear or branched $C_{1-6}$ alkyl group such as a methyl group, an ethyl group, a propyl group, an isopropyl group, or a butyl group.

Furthermore, the imidazole-based curing agent may be various modified products, and may be, for example, a cyanoethylated product in which an active hydrogen atom of an imino group (NH group) at a 1-position of an imidazole ring is cyanoethylated, a triazine product in which a cyanoethyl group of a cyanoethylated product is triazine, a modified product in which a hydroxymethyl group, an alkoxymethyl group, or the like is introduced at a 4-position and/or 5-position, or a salt thereof (a polyvalent carboxylic acid salt such as trimellitic acid, an isocyanuric acid salt, etc.).

A ratio of the curing agent with respect to 100 parts by mass of the epoxy resin may be, for example, about 1 part by mass to 10 parts by mass (e.g., about 2 parts by mass to 8 parts by mass), preferably about 2.5 parts by mass to 7.5 parts by mass (e.g., about 3 parts by mass to 7 parts by mass), and more preferably about 3.5 parts by mass to 6.5 parts by mass (e.g., about 4 parts by mass to 6 parts by mass).

[Curing Accelerator]

The first treatment agent may further contain a curing accelerator in order to accelerate the curing reaction by the curing agent. As the curing accelerator, a curing agent or a curing accelerator commonly used as a curing accelerator of an epoxy resin can be used, and a tertiary amine is preferable from the viewpoint that the epoxy resin can be cured under appropriate conditions. Examples of the tertiary amines include aliphatic amines such as triethylamine, triethanolamine, and dimethylaminoethanol, aromatic amines such as benzyldimethylamine and 2,4,6-tris(dimethylaminomethyl)phenol, and heterocyclic amines such as DBU, DABCO, and ATU. These tertiary amines may be used alone or in combination of two or more.

A ratio of the curing accelerator may be 10 parts by mass or less (e.g., about 1 part by mass to 10 parts by mass, preferably about 2 parts by mass to 6 parts by mass, and more preferably about 3 parts by mass to 5 parts by mass) with respect to 100 parts by mass of the epoxy resin.

[Aqueous Medium (Aqueous Solvent)]

The first treatment agent containing the epoxy resin (A), the polycarbonate polyol (B), and the blocked polyisocyanate (C) forms an aqueous treatment agent containing an aqueous medium (aqueous solvent). The aqueous medium (aqueous solvent) may be water alone or a mixed solvent of water and a water-soluble organic solvent. Examples of the water-soluble organic solvent include alcohols such as methanol, ethanol, propanol, and isopropanol; ketones such as acetone; ethers such as dioxane; amides such as N,N-dimethylformamide and N,N-dimethylacetamide; N-methylpyrrolidone; sulfoxides such as dimethyl sulfoxide; glycol ethers (e.g., cellosolves such as methyl cellosolve, ethyl cellosolve, and butyl cellosolve; carbitols such as methyl carbitol and ethyl carbitol; propylene glycol monomethyl ether); glycol ether esters (e.g., cellosolve acetate such as methyl cellosolve acetate, carbitol acetate, propylene glycol monomethyl ether acetate); glyme and diglyme. These water-soluble organic solvents may be used alone or in combination of two or more thereof.

The aqueous medium (aqueous solvent) is a solvent containing water as a main component, for example, a solvent having a water content of 50% by mass or more (preferably 75% by mass or more, and more preferably 90)% by mass or more) in many cases, and water may be used alone from the viewpoint of reducing the environmental load.

When a hydrophobic (or immiscible) organic solvent is used to hydrate at least one component selected from the epoxy resin (A), the polycarbonate polyol (B) and the blocked polyisocyanate (C) (in the form of an aqueous solution or an aqueous dispersion), some or unavoidable organic solvent may remain.

[Other Components (Additives)]

The polycarbonate polyol (B) may be used in combination with polymer polyol, for example, polyacryl polyol, polyester polyol, polyether polyol, if necessary.

Furthermore, the first treatment agent or the aqueous solvent may contain a surfactant or a dispersant, and such a component may be derived from a surfactant or a dispersant used in hydration of at least one component selected from the components (A), (B), and (C). If necessary, the first treatment agent may contain various additives, for example, additives such as stabilizers (antioxidants, ultraviolet absorbers, heat stabilizers, etc.), antioxidants, reactive diluents (low viscosity glycidyl ethers, e.g., monoglycidyl ethers), surface treatment agents, adhesiveness improvers, tackifiers, coupling agents, plasticizers, leveling agents, viscosity modifiers or rheology modifiers, preservatives, bactericides, fillers or fillers, colorants, and lubricants. A total amount of these additives may be 30% by mass or less (e.g., 0.01% by mass to 30% by mass), preferably about 0.05% by mass to 20% by mass (e.g., 0.1% by mass to 10% by mass) with respect to the total solid content of the first treatment agent.

The first treatment agent contains the epoxy resin (A), the polycarbonate polyol (B), and the blocked polyisocyanate (C), and may contain an aqueous urethane resin in which a reaction product of polyol such as polyester polyol or polyether polyol and polyisocyanate (such as aromatic polyisocyanate) is dissolved or dispersed in an aqueous medium, and/or a rubber latex. In the present invention, even when such components are not contained, it is possible to enhance the fraying resistance, the bending fatigue resistance, and the adhesiveness to the elastomer (or rubber).

A solid content concentration of the first treatment agent (first treatment liquid) can be selected from a range of, for example, about 1% by mass to 70% by mass (e.g., about 3% by mass to 50% by mass), and may be usually about 5% by mass to 40% by mass (e.g., about 7% by mass to 30% by mass), and preferably about 10% by mass to 25% by mass (e.g., about 10% by mass to 20% by mass). When the solid content concentration is too high, the impregnability and permeability of the treatment agent into the fibers may be reduced, and the bending fatigue resistance of the belt may be reduced.

(Treatment with First Treatment Agent)

The first treatment agent (first treatment liquid) may be prepared by dissolving or dispersing each component in an aqueous medium, or may be prepared by mixing solutions or dispersions of each component. If necessary, a water-insoluble component (e.g., a curing agent) may be dissolved and mixed in a water-soluble organic solvent.

The treatment of the untreated yarn (reinforcing fiber, raw yarn (multifilament yarn), or twisted yarn cord) with the first treatment agent (first treatment liquid) can be performed by a common method, for example, a method such as spraying, coating, or dipping, and a dipping method is often used. An immersion time is not particularly limited, and may be selected, for example, from a range of about 1 second to 10 minutes (e.g., 2 seconds to 1 minute), or may be about 1 second to 30 seconds (e.g., 2 seconds to 25 seconds), and preferably about 2 seconds to 20 seconds (e.g., 5 seconds to 15 seconds).

After the twisted yarn cord is treated with the first treatment agent, the twisted yarn cord may be dried as necessary. A drying temperature may be, for example, about 80° C. to 200° C. (e.g., about 100° C. to 190° C.), or preferably about 120° C. to 180° C. (e.g., about 130° C. to 170° C.). A drying time may be, for example, about 10 seconds to 30 minutes, preferably about 30 seconds to 10 minutes, and more preferably about 1 to 5 minutes, depending on the drying temperature. Furthermore, the drying may be performed by applying tension to the twisted yarn cord. The tension may be, for example, about 5 N to 20 N (e.g., about 7 N to 17 N), and preferably about 10 N to 15 N. When the twisted yarn cord is dried under the action of tension, the treatment agent is easily fitted to the twisted yarn cord, unevenness in twisting can be reduced, and variation in the diameter of the twisted yarn caused by unevenness in twisting can be reduced.

An adhesion ratio of the first treatment agent to the untreated yarn (twisted yarn cord, etc.) [(mass after treatment with first treatment agent−mass before treatment with first treatment agent)/mass after treatment with first treatment agent×100] can be selected from a range of, for example, about 0.1% by mass to 10% by mass (e.g., about 0.2% by mass to 7% by mass) in terms of solid content, and may be about 0.5% by mass to 5% by mass, preferably about 0.7% by mass to 4 mass %, and more preferably about 1% by mass to 3 mass %. An average thickness of the coating film formed by the first treatment agent can be selected from a range of, for example, about 0.001 μm to 20 μm (e.g., 0.005 μm to 15 μm), and may be about 0.01 μm to 10 μm (e.g.e, 0.05 μm to 5 μm), and preferably about 0.1 μm to 3 μm (e.g., 0.5 μm to 2 μm).

[Second Treatment Agent]

In the present invention, the cord (untreated yarn) is treated with at least the first aqueous treatment agent, and may be further treated with a second aqueous treatment agent. Therefore, the aqueous treatment agent according to the present invention may contain the first aqueous treatment agent (first aqueous treatment liquid) and the second aqueous treatment agent (second aqueous treatment liquid), and the present invention also includes a set of the first aqueous treatment agent and the second aqueous treatment agent. The second treatment agent (second aqueous treatment agent) contains at least resorcin (R), formaldehyde (F), and rubber or latex (L), and forms a resorcin-formaldehyde-latex (RFL) treatment liquid. When the treatment is performed with such a second treatment agent, the adhesiveness between the cord and the power transmission belt main body can be further improved even when the second treatment agent is aqueous.

The resorcin (R) and the formaldehyde (F) may be contained in the form of a mixture of the resorcin (R) and the formaldehyde (F), or may be contained in the form of a condensate thereof (an RF condensate, a condensate having a methylol group, etc.). The RF condensate (such as condensate having a methylol group, etc.) and the epoxy resin (A) and/or the blocked polyisocyanate (C) of the first treatment agent may be reacted or co-cured by the treatment with the second treatment agent in combination with the curing agent of the first treatment agent. By such a reaction or co-curing, a tough and strong coating film may be formed on the surface of the cord, and the fraying of the cord may be prevented to a high degree. Depending on the type of the latex (L), the epoxy resin (A), the blocked polyisocyanate (C), and/or the RF condensate (such as condensate having a methylol group, etc.) may react with the rubber of the latex (L).

The RF condensate is not particularly limited, and examples thereof include a novolac type, a resol type, and a combination (or a mixture) thereof. The RF condensate is preferably a combination (mixture) of the novolac type and the resol type since the RF condensate reacts with the epoxy resin of the first treatment agent and can form a coating film of the condensate on a surface of a treatment layer of the first treatment agent. When the novolac type and the resol type are combined, the epoxy resin cured between the fibers in the cord (untreated yarn such as twisted yarn cord) by the first treatment agent reacts with the novolac type RF condensate, and a larger amount of resol type RF condensates can form a strong RFL coating film having a high crosslinking density in a surface layer portion (or an outer peripheral portion) of the cord (twisted yarn cord, etc.). Therefore, it is possible to form a cured product in which the epoxy resin cured product for bonding the fibers to each other and the RFL coating film on the outer peripheral portion of the cord (untreated yarn such as twisted yarn cord) are integrated by the reaction between the novolac type RF condensate and the epoxy resin, and it is possible to improve the adhesiveness and the fraying resistance between the cord (untreated yarn such as twisted yarn cord) and the rubber.

The RF condensate may be, for example, a reaction product (e.g., initial condensate or prepolymer) produced by a reaction between resorcin and formaldehyde in the presence of water and a base catalyst (alkali metal salt such as sodium hydroxide; an alkaline earth metal salt; ammonia, etc.). As long as the effects of the present invention are not inhibited, aromatic phenols (monohydroxyarene such as phenol and cresol) may be used in combination with resorcin, and di- or polyhydroxyarene such as catechol and hydroquinone may be used in combination with resorcin. As the formaldehyde, a condensate of formaldehyde (e.g., trioxane, paraformaldehyde) may be used, or an aqueous solution of formaldehyde (formalin, etc.) may be used.

A ratio (usage ratio) of the formaldehyde can be selected from a range of about 0.1 mole to 5 mole (e.g., 0.2 mole to 2 mole) with respect to 1 mole of resorcin, and in the case of producing a mixture of the resol type and the novolac type, the ratio may be, for example, about 0.3 mole to 1 mole (e.g., 0.4 mole to 0.95 mole), preferably about 0.5 mole to 0.9 mole (e.g., 0.6 mole to 0.85 mole), and more preferably about 0.65 mole to 0.8 mole (e.g., 0.7 mole to 0.8 mole). When the ratio of the formaldehyde is too large, the ratio of the resol type RF condensate is too large, and thus there is a risk that the reaction with the epoxy resin may be decreased. Conversely, when the ratio of the formaldehyde is too small, the ratio of novolak type RF condensate is too small, and thus the strength of the coating film formed by the second treatment agent may be decreased.

The rubber or elastomer constituting the latex is not particularly limited as long as flexibility can be imparted to the cord, and examples thereof include diene rubbers [e.g., natural rubber, isoprene rubber, butadiene rubber, chloroprene rubber, styrene-butadiene rubber, vinylpyridine-styrene-butadiene copolymer rubber, acrylonitrile-butadiene rubber (nitrile rubber), hydrogenated products of these diene rubbers], olefin rubbers [e.g., ethylene-α-olefin rubber (ethylene-α-olefin elastomer), polyoctenylene rubber, ethylene-vinyl acetate copolymer rubber, chloroprene rubber, chlorosulfonated polyethylene rubber, alkylated chlorosulfonated polyethylene rubber], acrylic rubbers, silicone rubbers, urethane rubbers, epichlorohydrin rubbers, fluororubbers, and combinations thereof. These rubbers may be used alone or in combination of two or more. As the latex, a latex of a vinylpyridine-styrene-butadiene copolymer rubber is often used. As the rubber, the same or similar rubber or elastomer as the rubber or elastomer into which the cord is embedded may be preferably used.

A ratio of the latex can be selected from a range of about 30 parts by mass to 700 parts by mass (e.g., 40 parts by mass to 650 parts by mass) with respect to 100 parts by mass of the solid content of the RF condensate in terms of the solid content, and may be, for example, about 50 parts by mass to 600 parts by mass (e.g., 75 parts by mass to 500 parts by mass), preferably about 100 parts by mass to 400 parts by mass (e.g., 125 parts by mass to 300 parts by mass), and more preferably about 150 parts by mass to 250 parts by mass (e.g., 200 parts by mass to 250 parts by mass).

The second treatment agent usually contains the same aqueous medium (water, etc.) as the first treatment agent. If necessary, the second treatment agent may contain an additive (e.g., a vulcanizing agent, a vulcanization accelerator, or a co-vulcanizing agent) involved in vulcanization or cross-linking of the rubber or the elastomer, in addition to the same additive (e.g., an additive such as a surfactant, a dispersant, or a stabilizer) as the first treatment agent.

A solid content concentration of the second treatment agent may be, for example, about 0.1% by mass to 30% by mass (e.g., about 0.5% by mass to 27% by mass), preferably about 1% by mass to 25% by mass (e.g., about 2% by mass to 20% by mass), and more preferably about 3% by mass to 17% by mass (e.g., about 5% by mass to 15% by mass). The second treatment agent having such a solid content concentration can adjust an adhesion amount to the untreated yarn (twisted yarn cord, etc.) treated with the first treatment agent to an appropriate range, and can efficiently improve the properties of the cord.

The treatment method using the second treatment agent is the same as the treatment method using the first treatment agent. A drying temperature may be the same as the drying temperature in the treatment with the first treatment agent, and may be about 150° C. to 250° C. (e.g., 170° C. to 220° C.).

An adhesion ratio of the second treatment agent [(mass after treatment with second treatment agent−mass before treatment with second treatment agent)/mass after treatment with second treatment agent×100] can be selected from a range of, for example, about 0.1% by mass to 25% by mass (e.g., 0.5% by mass to 22% by mass) in terms of solid content, and may be about 1% by mass to 20% by mass (e.g., 1.5% by mass to 15% by mass), and preferably about 2% by mass to 10% by mass (e.g., 3% by mass to 8% by mass). An average thickness of the coating film formed by the second treatment agent may be, for example, about 1 μm to 30 μm, preferably about 2 μm to 25 μm, and more preferably about 5 μm to 20 μm.

As described above, although the second treatment agent is not necessarily required, the ratio (mass ratio) of the adhesion amount of the first treatment agent to the adhesion amount of the second treatment agent can be selected from a range of, for example, the former/latter of about 0.1/1 to 20/1 (e.g., 0.3/1 to 15/1) in terms of solid content, and may be about 0.5/1 to 12/1, preferably about 1/1 to 10/1, and more preferably about 2/1 to 8/1 (e.g., 3/1 to 7/1).

In the present invention, after the treatment with the second treatment agent, if necessary, the treatment may be performed with a third treatment agent containing rubber or elastomer (e.g., aqueous rubber latex, organic solvent solution of rubber, or rubber glue), but from the viewpoint of simplifying the process and improving the working environment and environmental load, it is preferable not to use the third treatment agent (rubber glue) containing at least an organic solvent. Furthermore, in the present invention, even when the third treatment agent is not used, a cord having high fraying resistance and bending fatigue resistance can be produced, and the adhesiveness to the matrix rubber can be improved.

An average diameter of the cord may be, for example, about 0.3 mm to 3.6 mm (e.g., about 0.4 mm to 3.5 mm), preferably about 0.5 mm to 3.3 mm (e.g., about 0.55 mm to 3.1 mm), and more preferably about 0.6 mm to 2.7 mm (e.g., about 0.7 mm to 2.5 mm).

[Power Transmission Belt and Method for Producing Same]

The cord is prepared by treating an untreated yarn with the first aqueous treatment agent. The cord may be prepared by treating the untreated yarn with the first aqueous treatment agent and then treating the yarn with the second aqueous treatment agent. The cord includes a cured product obtained by the first treatment agent penetrating into the surface and between the fibers (or between the raw yarns) and being cured. When the cord is further treated with the second treatment agent, the cord includes a cured product obtained by an RFL liquid reacting with the epoxy resin and being cured. Such a cord is suitable as a cord for rubber reinforcement, for example, a cord for a power transmission belt. The cord is usually used by being embedded in a rubber layer (crosslinked rubber layer) of a power transmission belt.

The power transmission belt includes the cord, and usually includes a rubber layer in which the cord (usually a plurality of cords) is embedded along a longitudinal direction (or a circumferential direction) of a belt main body in many cases, and the cord may be embedded in parallel at a predetermined pitch in parallel with the longitudinal direction of the belt main body. An interval (spinning pitch) between adjacent cords may be, for example, about 0.5 mm to 4 mm (e.g., about 0.6 mm to 2.5 mm), preferably about 0.7 mm to 2.3 mm (e.g., about 0.8 mm to 2 mm), or about 0.5 mm to 2 mm (e.g., about 0.6 mm to 1.8 mm), more preferably about 0.7 mm to 1.7 mm (e.g., about 0.8 mm to 1.5 mm), depending on the cord diameter.

The rubber layer of the power transmission belt can be formed of a composition containing an unvulcanized rubber, and examples of the unvulcanized rubber include diene rubbers (natural rubber, isoprene rubber, butadiene rubber, chloroprene rubber, butyl rubber, styrene-butadiene rubber (SBR), vinylpyridine-styrene-butadiene rubber, acrylonitrile-butadiene rubber (nitrile rubber: NBR), acrylonitrile-chloroprene rubber, hydride nitrile rubber (HNBR), and the like), ethylene-$\alpha$-olefin elastomers, chlorosulfonated polyethylene rubbers (CSM), alkylated chlorosulfonated polyethylene rubbers (ACSM), epichlorohydrin rubbers, acrylic rubbers, silicone rubbers, urethane rubbers, and fluororubbers. These rubber components may be carboxylated, such as carboxylated SBR and carboxylated NBR. These rubber components may be used alone or in combination of two or more.

The rubber component preferably contains at least ethylene-$\alpha$-olefin elastomer (or ethylene-$\alpha$-olefin-rubber) such as an ethylene-propylene copolymer (EPM) or an ethylene-propylene-diene terpolymer (EPDM) as a main component.

An unvulcanized rubber composition may contain common components, and examples of such components include reinforcing agents such as carbon black and/or silica, short fibers, polyvalent metal salts of (meth)acrylic acid such as zinc(meth)acrylate and magnesium(meth)acrylate, vulcanizing agents and/or crosslinking agents (organic peroxides, etc.), co-crosslinking agents (alkane polyol poly(meth)acrylates such as ethylene glycol dimethacrylate, butanediol dimethacrylate, and trimethylolpropane trimethacrylate; triallyl(iso)cyanurate; bismaleimide such as N,N'-m-phenylene bismaleimide and N,N'-(4,4'-diphenylmethane bismaleimide), vulcanization aids, vulcanization accelerators (thiuram based accelerators, etc.), vulcanization accelerator aids (stearic acid, etc.), vulcanization retarders, metal oxides (e.g., zinc oxide, magnesium oxide, calcium oxide, barium oxide, iron oxide, copper oxide, titanium oxide, and aluminum oxide), fillers (clay, calcium carbonate, talc, mica, etc.), plasticizers, surfactants, softeners (paraffin oil, naphthenic oil, etc.), processing agents or processing aids (stearic acid metal salt, wax, paraffin, etc.), anti-aging agents (aromatic amine based anti-aging agents, benzimidazole based anti-aging agents, etc.), adhesiveness improvers [resorcin-formaldehyde co-condensate, melamine resin such as hexamethoxymethylmelamine, co-condensate thereof (such as resorcin-melamine-formaldehyde co-condensate), etc], colorant, tackifier, coupling agent (silane coupling agent, etc.), stabilizer (antioxidant, ultraviolet absorber, heat stabilizer, etc.), lubricant, flame retardant, and antistatic agents. These additives may be used alone or in combination.

The power transmission belt may include a cover fabric (or a reinforcing fabric) such as canvas.

Examples of such a power transmission belt include a V-ribbed belt, a flat belt, a toothed belt and a V-belt such as a wrapped V-belt and a raw edge V-belt.

Typically, the power transmission belt may include an adhesive rubber layer and a compression rubber layer on one surface of the adhesive rubber layer, and the cord may be embedded in the adhesive rubber layer. A tension rubber layer may be provided on the other surface of the adhesive rubber layer. In the power transmission belt, a part of the belt main body formed of the rubber layer (e.g., the surface of the tension rubber layer and/or the compression rubber layer) or the whole thereof may be covered (or laminated) with a reinforcing fabric.

Figure 1:
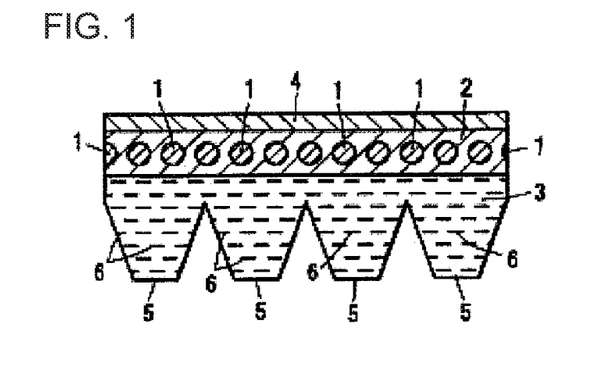
FIG. 1 is a schematic cross-sectional view showing an example of a power transmission belt.

FIG. 1 is a schematic cross-sectional view showing a V-ribbed belt as an example of a power transmission belt. In this example, the belt includes an adhesive rubber layer 2 in which cords 1 are embedded in a longitudinal direction of the belt, a compression rubber layer 3 formed on one surface (inner peripheral surface) of the adhesive rubber layer, and a tension rubber layer 4 formed on the other surface (outer peripheral surface or back surface) of the adhesive rubber layer, and V-shaped groove ribs 5 are formed on the compression rubber layer 3. The compression rubber layer 3 contains polyamide short fibers 6 in order to improve lateral pressure resistance of the power transmission belt. In many cases, the adhesive rubber layer 2, the compression rubber layer 3, and the tension rubber layer 4 are each formed of a rubber composition. Further, a reinforcing fabric formed of a woven fabric, a nonwoven fabric, a knitted fabric, and the like may be laminated on the back surface of the tension rubber layer 4.

Figure 2:
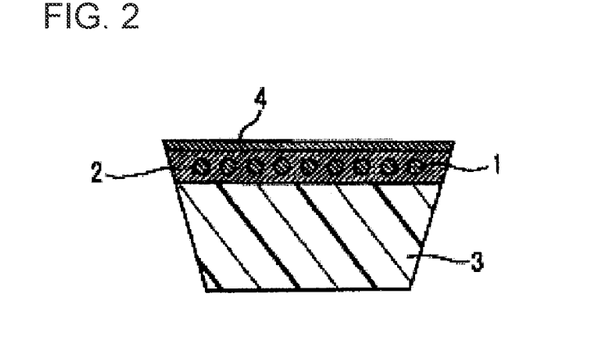
FIG. 2 is a schematic cross-sectional view showing another example of the power transmission belt.

FIG. 2 is a schematic cross-sectional view showing a raw edge V-belt that is another example of the power transmission belt. The belt shown in FIG. 2 is configured in the same manner as in FIG. 1 except that the ribs 5 are not formed on the compression rubber layer 3 and that the belt has a trapezoidal shape in which a belt width is decreased from an outer peripheral surface toward an inner peripheral surface. In the compression rubber layer 3, a plurality of cogs (convex portions) may be formed at predetermined intervals along the longitudinal direction of the belt. The reinforcing fabric formed of a woven fabric, a nonwoven fabric, a knitted fabric, and the like may be laminated on the surface (inner peripheral surface) of the compression rubber layer 3 and the surface (outer peripheral surface) of the tension rubber layer 4.

These power transmission belts are formed by sequentially winding an unvulcanized rubber sheet for a compression rubber layer and an unvulcanized rubber sheet for a first adhesion rubber layer around a cylindrical forming drum, spirally spinning a cord thereon, further sequentially winding an unvulcanized rubber sheet for a second adhesion rubber layer and an unvulcanized rubber sheet for a tension rubber layer to form a laminate, vulcanizing the laminate to produce a vulcanization belt sleeve, and cutting the cylindrical vulcanization belt sleeve in a circumferential direction. At the time of this cutting, the cords arranged or oriented in the circumferential direction are also cut, and the cords are exposed to a side surface (cut surface) of the power transmission belt. When the cord is exposed to the side surface of the power transmission belt, the cord is easily loosened, and pop-out occurs in which the cord protrudes from the side surface of the power transmission belt with the cord loosened from the side surface of the power transmission belt as a starting point. The pop-out cord may be wound around a shaft of a rotating pulley to break the power transmission belt. However, since the cord treated with the specific treatment agent is embedded in the rubber layer (the adhesive rubber layer in the power transmission belt shown in FIG. 1 and FIG. 2) and the binding property between the filaments of the cord is high, the cord is not loosened on the side surface of the power transmission belt, popping out of the cord can be effectively prevented, and the durability of the power transmission belt can be significantly improved.

The power transmission belt can be manufactured by a common method including an embedding step of embedding a cord in a rubber layer along a longitudinal direction of a belt depending on a type of the belt. For example, the power transmission belt can be manufactured by a method in which a cylindrical laminate in which a cord treated with a specific treatment agent is sandwiched or embedded between a pair of unvulcanized rubber sheets (including unvulcanized laminated rubber sheets) may be vulcanized to produce a power transmission belt precursor (vulcanized belt sleeve), and the cylindrical power transmission belt precursor may be cut in the circumferential direction. In the present invention, even when the cutting is performed in this manner, fluffing or fraying of the cord is not generated on the side surface (transmission surface) of the power transmission belt. In many cases, the pair of unvulcanized rubber sheets are formed of the same or different rubber compositions.

EXAMPLE

The present invention is described below in detail based on examples. However, the present invention is not limited by the examples.

[Preparation of Cord]

Aramid twisted yarn cord: a plied twisted cord having a total fineness of 3300 dtex (the number of filaments: 3000) formed by twisting a bundle of aramid fibers having a fineness of 1100 dtex (the number of filaments: 1000) in a twisted configuration of 1×3 with a primary twist factor of 4.0 and a secondary twist factor of 2.8.

[First Treatment Agent]

A first treatment agent containing the following components was prepared. That is, components of the first treatment agent shown in Table 1 were mixed and stirred at a room temperature for 10 minutes to prepare various first treatment agents (treatment liquids).

Aqueous dispersion of bisphenol A type epoxy resin: "Yuka Resin NE-307H" (aqueous dispersion of a bisphenol A type epoxy resin (jER #1007, manufactured by Mitsubishi Chemical Corporation) having a molecular weight of about 2900, an epoxy equivalent of 1750 g/eq to 2200 g/eq, and a softening point (ring and ball method) of 128° C.) manufactured by Yoshimura Oil Chemical Co., Ltd., solid content concentration: 50% by mass Aqueous dispersion of polycarbonate polyol: "Yuka Resin PEP-50" manufactured by Yoshimura Oil Chemical Co., Ltd., solid content concentration: 60% by mass, hydroxyl group equivalent (solid content): 267 g/eq As described above, the hydroxyl group equivalent can be calculated based on a hydroxyl group value and the formula: hydroxyl group equivalent=1/[(hydroxyl group value mgKOH/g)/1000/56.1].

Aqueous dispersion of blocked polyisocyanate: "Yuka Resin AK-81" (aqueous dispersion of blocked polyisocyanate based on hexamethylene diisocyanate and having a dissociation temperature of about 140° C.) manufactured by Yoshimura Oil Chemical Co., Ltd., solid content concentration of 45% by mass, isocyanate group equivalent (solid content) of 360 g/eq Imidazoles: "Curezol 2E4MZ-CN" manufactured by Shikoku Chemicals Corporation

TABLE 1

| | | First Treatment Agent | | | | | | | | | |
|---|---|---|---|---|---|---|---|---|---|---|---|
| | | A | B | C | D | E | F | G | H | I | J |
| Composition (parts by mass) | Aqueous dispersion of bisphenol A type epoxy resin | 200 | 200 | 200 | 200 | 200 | 200 | 200 | 200 | 200 | 200 |
| | Aqueous dispersion of polycarbonate polyol | 120 | 40 | 15 | 0 | 180 | 7 | 40 | 40 | 40 | 40 |
| | Aqueous dispersion of blocked polyisocyanate | 440 | 300 | 250 | 220 | 550 | 230 | 230 | 350 | 180 | 410 |
| | Imidazoles | 5 | 5 | 5 | 5 | 5 | 5 | 5 | 5 | 5 | 5 |
| | Water | 1700 | 1200 | 1000 | 1200 | 2100 | 950 | 1050 | 1300 | 950 | 1400 |
| | Total | 2465 | 1745 | 1470 | 1625 | 3035 | 1392 | 1525 | 1895 | 1375 | 2055 |
| Solid content concentration (% by mass) | | 15% | 15% | 15% | 12% | 15% | 15% | 15% | 15% | 15% | 15% |
| Ratio of functional groups * | | 1:1:2 | 3:1:4 | 9:1:10 | 1:0:1 | 0.67:1:1.67 | 19:1:20 | 31.:3.2 | 3:1:4.8 | 3:1:2.4 | 3:1:5.6 |
| Mole ratio of OH groups * * | | 50/50 | 75/25 | 90/10 | 100/0 | 40/60 | 95/5 | 75/25 | 75/25 | 75/25 | 75/25 |
| Mole ratio of NCO groups * * * | | 1 | 1 | 1 | 1 | 1 | 1 | 0.8 | 1.2 | 0.6 | 1.4 |

In the table, * "ratio of the number of functional groups" indicates a ratio of the number of OH groups of the bisphenol A type epoxy resin:the number of OH groups of the polycarbonate polyol:the number of NCO groups of the blocked polyisocyanate.
* * "molar ratio of OH groups" indicates the ratio of the number of OH groups of the bisphenol A type epoxy resin to the number of OH groups of the polycarbonate polyol.
* * * "molar ratio of NCO group" indicates a ratio of the number of moles of NCO group of blocked polyisocyanate to 1 mole of the total amount of OH group of bisphenol A type epoxy resin and polycarbonate polyol.

[Second Treatment Agent]

Constituent components of the second treatment agent (RFL liquid) are shown in Table 2. First, resorcin was added to water and dissolved by stirring at a room temperature for 30 minutes, then 37% by mass of formalin was added, and the mixture was further stirred at a room temperature for 30 minutes to react to obtain a liquid X.

Next, latex was diluted with water to prepare a liquid Y, and the liquid X was added thereto and mixed with stirring. The mixed solution was aged at 25° C. for 6 days and then diluted with water (liquid Z) so as to have a solid content concentration of 10% by mass to prepare a second treatment agent (RFL solution).

As the latex, a styrene-butadiene-vinylpyridine copolymer (manufactured by Zeon Corporation) was used.

TABLE 2

| | Second Treatment Agent | |
|---|---|---|
| | Constituent component | Parts by mass |
| Liquid X | Resorcin | 122 |
| | 37% by mass of formalin | 68 |
| | Water | 400 |
| Liquid Y | Vinylpyridine-styrene-butadiene copolymer latex (solid content concentration: 41.5% by mass) | 800 |
| | Water | 510 |
| Liquid Z | Water | 2900 |
| | Total (X + Y + Z) | 4800 |
| | Solid content concentration | 10% by mass |

[Preparation of Cord]

The untreated aramid twisted yarn cord was immersed in a first treatment agent (25° C.) for 10 seconds and then dried at 150° C. for 2 minutes, and subsequently immersed in a second treatment agent (25° C.) for 10 seconds and then dried at 200° C. for 2 minutes to obtain a treated cord to which an adhesive component was attached.

[Preparation of V-Ribbed Belt]

The following components were used as an unvulcanized rubber composition of a belt.

EPDM: "IP3640" manufactured by DuPont Dow Elastomer Japan Co., Ltd., Mooney viscosity: 40 (100° C.)

Zinc oxide: "Zinc Oxide third grade" manufactured by Seido Chemical Industry Co., Ltd.

Carbon black HAF: "SEAST 3" manufactured by Tokai Carbon Co., Ltd.

Stearic acid: "Stearic acid Tsubaki" manufactured by NOF Corporation

Hydrous silica: "Nipsil VN3" manufactured by Tosoh Silica Corporation, BET specific surface area: 240 m²/g Resorcin-formaldehyde condensate: less than 20% of resorcinol and less than 0.1% of formalin Antioxidant: "Nonflex OD3" manufactured by Seiko Chemical Co., Ltd.

Vulcanization accelerator DM: di-2-benzothiazolyl disulfide

Hexamethoxymethylol melamine: "PP-1890S" manufactured by Power Plast

Polyamide short fiber: "66 Nylon" manufactured by Asahi Kasei Corporation

Cotton short fiber: average fiber diameter 13 μm, average fiber length 6 mm

Mercaptobenzimidazole: "Nocrac MB" manufactured by Ouchi Shinko Chemical Industrial Co., Ltd.

Paraffinic softener: "Diana Process Oil" manufactured by Idemitsu Kosan Co., Ltd.

Dibenzoyl-quinone dioxime: "Vulnoc DGM" manufactured by Ouchi Shinko Chemical Industrial Co., Ltd.

Organic peroxide; "Percadox 14RP" manufactured by Kayaku Akzo Co., Ltd.

First, a rubber-attached cotton canvas of one ply (one stack) was wound around an outer periphery of a cylindrical molding mold having a smooth surface, and an unvulcanized adhesive rubber layer sheet formed of a rubber composition shown in Table 3 was wound around an outside of the cotton canvas. Next, the treatment cord was spirally spun and wound on the adhesive rubber layer sheet in a state of being arranged in parallel at a pitch of 0.95 mm, and further, the unvulcanized adhesive rubber layer sheet formed of the rubber composition and the unvulcanized compression rubber layer sheet formed of the rubber composition shown in Table 4 were wound thereon in order. In a state in which a vulcanization jacket was disposed outside the compression rubber layer sheet, a molding mold was placed in a vulcanization can and vulcanized. A cylindrical vulcanized rubber sleeve formed by vulcanization was taken out from the molding mold, a plurality of V-shaped grooves were simultaneously ground in the compression rubber layer of the vulcanized rubber sleeve by a grinder, and then the vulcanized rubber sleeve was cut in a circumferential direction by a cutter so as to be sliced, thereby obtaining a V-ribbed belt having three ribs and a circumferential length of 1100 mm. The belt does not include a tension rubber layer.

TABLE 3

| Composition for adhesive rubber layer | |
|---|---|
| Constituent component | Parts by mass |
| EPDM | 100 |
| Stearic acid | 1 |
| Zinc oxide | 5 |
| Carbon black HAF | 35 |
| Hydrous silica | 20 |
| Resorcin-formaldehyde condensate | 2 |
| Antioxidant | 2 |
| Vulcanization accelerator DM | 2 |
| Hexamethoxymethylol melamine | 2 |
| Sulfur | 1 |
| Total | 170 |

TABLE 4

| Composition for compression rubber layer | |
|---|---|
| Constituent component | Parts by mass |
| EPDM | 100 |
| Polyamide short fiber | 15 |
| Cotton short fiber | 25 |
| Zinc oxide | 5 |
| Stearic acid | 1 |
| Mercaptobenzoimidazole | 1 |
| Carbon black HAF | 60 |
| Paraffin softener | 10 |
| Organic peroxide | 4 |
| Dibenzoyl-quinone dioxime | 2 |
| Total | 223 |

Then, the characteristics of the obtained V-ribbed belt and cord were evaluated as follows.

[Evaluation of Fraying Resistance]

The side surface of the belt was visually observed, and the presence or absence of the fraying of the cord was confirmed.

[Evaluation of Adhesiveness Between Cord and Rubber]

Figure 3:
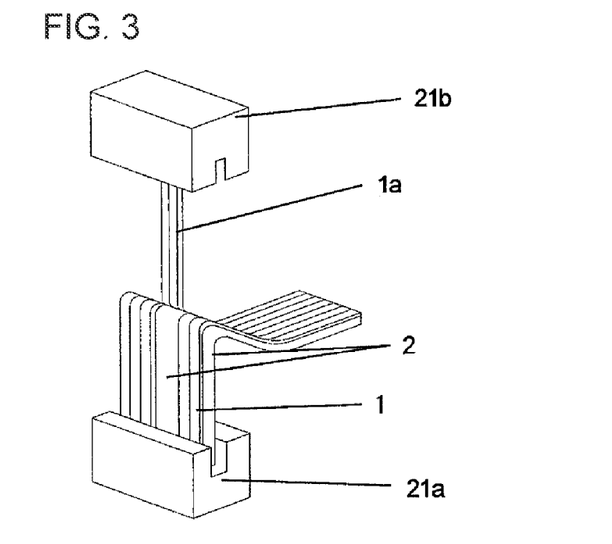
FIG. 3 is a schematic perspective view for illustrating a method of evaluating adhesiveness between a cord and a rubber.

As shown in FIG. 3, in the obtained V-ribbed belt, after the canvas on the back surface of the belt was separated, two adjacent cords 1a among the cords 1 adhered to the rubber layer were pulled from the adhesive rubber layer 2 on the compression rubber layer side. In a state in which one end of the V-ribbed belt was gripped by a gripping tool 21a, cords 1a were gripped by a gripping tool 21b of an autograph ("AGS-J10 kN" manufactured by Shimadzu Corporation), and a separating test was performed at a tensile speed of 50 mm/min to measure the adhesive force between the cords 1 and the adhesive rubber layer 2 at an atmospheric temperature of 23° C. (two-cord separating force).

[Traveling Durability Test]

Figure 4:
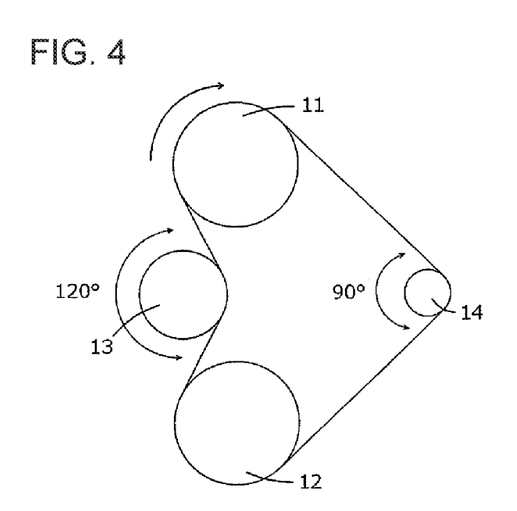
FIG. 4 is a schematic view for illustrating a traveling durability test method.

As shown in FIG. 4, the obtained V-ribbed belt was wound around a driving pulley 11 (diameter: 120 mm, number of revolutions: 4900 rpm), a driven pulley 12 (diameter; 120 mm, load: 8.8 kW) an idler pulley 13 (diameter: 85 mm), and a tension pulley 14 (diameter: 45 mm, axial load: 60 kgf (constant)), and allowed to run at an atmospheric temperature of 120° C. to the end of life.

The bending fatigue resistance was evaluated by terminating a running time at 200 hours and measuring the tensile strength before and after the traveling durability test. Specifically, the tensile strength of the belt before and after running for 200 hours was measured by using a universal testing machine ("UH-200kNX" manufactured by Shimadzu Corporation) under the condition of a tensile speed of 50 mm/min, and the strength at the time of breaking of the belt was measured. The strength retention rate was calculated by the following formula.

Strength retention rate (%)=(Strength after traveling durability test/Strength before traveling durability test)×100

The results are shown in Table 5 below.

INDUSTRIAL APPLICABILITY

An aqueous treatment agent according to the present invention is useful for preparing a cord of a power transmission belt. When such a cord is used, the fraying resistance and the bending fatigue resistance of the power transmission belt can be greatly improved, the adhesiveness to rubber can be improved, and the durability can be greatly improved. Therefore, it can be effectively used for a power transmission belt for increasing tensile strength by being bonded to a rubber layer such as a V-belt.

REFERENCE SIGNS LIST

1 Cord
2 Adhesive rubber layer
3 Compression rubber layer
4 Tension rubber layer
5 Rib

TABLE 5

| | | Examples | | | | | | | | | Comparative Example |
|---|---|---|---|---|---|---|---|---|---|---|---|
| | | 1 | 2 | 3 | 4 | 5 | 6 | 7 | 8 | 9 | 1 |
| First treatment agent | | A | B | C | E | F | G | H | I | J | D |
| Fraying resistance | | No fraying | No fraying | No fraying | No fraying | No fraying | No fraying | No fraying | No fraying | No fraying | Fraying |
| Two-cord separating force (N) | | 13.5 | 14.2 | 12.9 | 12.0 | 12.4 | 13.2 | 13.4 | 12.3 | 12.7 | 11.6 |
| Traveling Durability | Life (h) | 330 | 350 | 300 | 300 | 300 | 320 | 300 | 300 | 300 | 220 |
| | Failure mode | Rib crack | Rib crack | Rib crack | Rib crack | Rib crack | Rib crack | Rib crack | Rib crack | Rib crack | Break |
| | Strong retention rate | 72% | 75% | 67% | 72% | 61% | 70% | 67% | 67% | 60% | 51% |

Examples 1 to 9 were excellent in fraying resistance, adhesiveness, and bending fatigue resistance. In Comparative Example 1 in which polycarbonate polyol was not contained, the toughness of the adhesive coating film was low, and therefore the fraying resistance and the bending fatigue resistance were deteriorated. From the comparison of Examples 1 to 5, it can be seen that when the ratio of the polycarbonate polyol is too low, the strength retention rate (bending fatigue resistance) was decreased. That is, in Examples 3 and 5, the amount of epoxy is relatively large with respect to the polyol, and the toughness of the adhesive coating film is not so high. On the other hand, it can be seen that when the ratio of the polycarbonate polyol is too high, the two-cord separating force (adhesiveness) was decreased. Further, from the comparison between Example 2 and Examples 6 to 9, it can be seen that when the ratio of the blocked polyisocyanate is too low, the adhesiveness is lowered. On the other hand, it can be seen that when the ratio of the blocked polyisocyanate is too high, the bending fatigue resistance was decreased.

Although the present invention has been described in detail with reference to a specific embodiment, it is obvious to those skilled in the art that various changes and modifications may be made without departing from the gist and the scope of the invention.

This application is based on Japanese Patent Application 2019-051513 filed on Mar. 19, 2019, and Japanese Patent Application 2020-33980 filed on Feb. 28, 2020, contents of which are incorporated by reference herein.

The invention claimed is:

1. An aqueous treatment agent for preparing a cord by treating an untreated yarn for a power transmission belt, comprising at least a first aqueous treatment agent,
   wherein the first aqueous treatment agent contains an epoxy resin (A), a polycarbonate polyol (B), and a blocked polyisocyanate (C).

2. The aqueous treatment agent according to claim 1,
   wherein the epoxy resin (A) contains a bisphenol type epoxy resin (A1),
   the polycarbonate polyol (B) contains a polycarbonate diol (B1), and
   the blocked polyisocyanate (C) contains at least one blocked polyisocyanate selected from the group consisting of an aliphatic polyisocyanate or derivatives thereof and an aromatic polyisocyanate and having a dissociation temperature of 120° C. to 180° C.

3. The aqueous treatment agent according to claim 1,
   wherein the epoxy resin (A) has an epoxy equivalent of 450 g/eq to 5000 g/eq in terms of solid content or non-volatile content,
   the polycarbonate polyol (B) has a hydroxyl group equivalent of 200 g/eq to 600 g/eq in terms of solid content or non-volatile content, and
   the blocked polyisocyanate (C) has an isocyanate group equivalent of 200 g/eq to 600 g/eq in terms of solid content or non-volatile content.

4. The aqueous treatment agent according to claim 1,
   wherein a molar ratio of a hydroxyl group of the epoxy resin (A) to a hydroxyl group of the polycarbonate polyol (B) is 45/55 to 95/5 of the former/latter, and a ratio of an isocyanate group of the blocked polyisocyanate (C) to 1 mol of a total amount of the hydroxyl groups of the epoxy resin (A) and the polycarbonate polyol (B) is 0.7 mol to 1.3 mol.

5. The aqueous treatment agent according to claim 1, wherein the first aqueous treatment agent further contains a curing agent.

6. The aqueous treatment agent according to claim 5, wherein the curing agent contains an imidazole-based curing agent.

7. The aqueous treatment agent according to claim 1, further comprising a second aqueous treatment agent, wherein the second aqueous treatment agent contains resorcin, formaldehyde, and latex.

8. A cord for a power transmission belt comprising an untreated yarn treated with the aqueous treatment agent according to claim 1.

9. A cord for a power transmission belt comprising an untreated yarn sequentially treated with the aqueous treatment agent according to claim 1, and the second aqueous treatment agent containing resorcin, formaldehyde, and latex.

10. The cord for a power transmission belt according to claim 8, wherein the untreated yarn comprises at least one selected from the group consisting of an aramid fiber and a polyester fiber.

11. The cord for a power transmission belt according to claim 8, wherein the untreated yarn comprises a para-aramid fiber.

12. The cord for a power transmission belt according to claim 8, wherein the untreated yarn is a twisted yarn cord.

13. A power transmission belt comprising the cord for a power transmission belt according to claim 8.

14. The power transmission belt according to claim 13, wherein the cord for a power transmission belt is embedded in a vulcanized rubber layer.

15. A method for producing a cord for a power transmission belt, comprising treating an untreated yarn with the aqueous treatment agent according to claim 1.

16. The method for producing a cord for a power transmission belt according to claim 15, comprising, after treating the untreated yarn with the aqueous treatment agent, treating the yarn with a second aqueous treatment agent containing resorcin, formaldehyde, and latex.

* * * * *